US011338790B2

(12) United States Patent
Tabata et al.

(10) Patent No.: US 11,338,790 B2
(45) Date of Patent: May 24, 2022

(54) CONTROL DEVICE FOR HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Takashi Kohno, Tokai (JP); Yasutaka Tsuchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 16/924,132

(22) Filed: Jul. 8, 2020

(65) Prior Publication Data

US 2021/0086747 A1 Mar. 25, 2021

(30) Foreign Application Priority Data

Sep. 20, 2019 (JP) .............................. JP2019-172307

(51) Int. Cl.
*B60W 10/08* (2006.01)
*B60W 20/13* (2016.01)
*B60W 20/20* (2016.01)

(52) U.S. Cl.
CPC ............ *B60W 20/13* (2016.01); *B60W 10/08* (2013.01); *B60W 20/20* (2013.01)

(58) Field of Classification Search
CPC ...... B60W 10/06; B60W 10/08; B60W 20/10; B60W 20/40
See application file for complete search history.

(56) References Cited

U.S. PATENT DOCUMENTS

| 11,007,998 B1* | 5/2021 | Suh ......................... B60K 6/48 |
| 2014/0123963 A1* | 5/2014 | Glugla ................ F02B 29/0468 |
| | | 123/542 |
| 2015/0120115 A1* | 4/2015 | Chinbe ................. B60W 20/00 |
| | | 701/22 |
| 2019/0003408 A1* | 1/2019 | Hata ..................... B60W 20/19 |
| 2019/0232945 A1* | 8/2019 | Matsumoto ........... B60W 10/06 |
| 2020/0109675 A1* | 4/2020 | Han .......................... F01N 3/10 |
| 2020/0182202 A1* | 6/2020 | Hong ..................... F02B 47/08 |
| 2020/0290592 A1* | 9/2020 | Yonezawa ............. B60W 10/08 |
| 2021/0010410 A1* | 1/2021 | Tabata .................. B60W 20/10 |

(Continued)

FOREIGN PATENT DOCUMENTS

JP 2008247205 A 10/2008

*Primary Examiner* — Jeffrey J Restifo
(74) *Attorney, Agent, or Firm* — Hunton Andrews Kurth LLP

(57) ABSTRACT

Since a maximum rotation speed is set to a lower value when a supercharging pressure from a supercharger is high than when the supercharging pressure is low, an engine torque is decreased at a relatively low engine rotation speed and the engine rotation speed is less likely to fall into a high-rotation state. Since the maximum rotation speed is set to a relatively high value when the supercharging pressure is relatively low and the engine rotation speed is less likely to fall into a high-rotation state, the engine torque is not decreased at a relatively high engine rotation speed and power performance can be easily secured. Accordingly, it is possible to curb a decrease in power performance due to a decrease in the engine torque and to prevent the engine rotation speed from falling into a high-rotation state.

9 Claims, 10 Drawing Sheets

(56) References Cited

U.S. PATENT DOCUMENTS

| | | | |
|---|---|---|---|
| 2021/0025346 A1* | 1/2021 | Tabata | F02D 41/2441 |
| 2021/0031747 A1* | 2/2021 | Tabata | B60W 10/10 |
| 2021/0034074 A1* | 2/2021 | Hiasa | B60W 10/101 |
| 2021/0039626 A1* | 2/2021 | Matsubara | B60W 10/10 |
| 2021/0039628 A1* | 2/2021 | Tabata | B60W 10/08 |
| 2021/0062740 A1* | 3/2021 | Yasuda | F02D 41/0007 |
| 2021/0062767 A1* | 3/2021 | Yasuda | F02M 25/0836 |
| 2021/0078563 A1* | 3/2021 | Tabata | B60K 6/445 |
| 2021/0086747 A1* | 3/2021 | Tabata | B60K 6/383 |
| 2021/0086748 A1* | 3/2021 | Tabata | B60W 50/0097 |
| 2021/0086749 A1* | 3/2021 | Tabata | B60W 10/10 |
| 2021/0086751 A1* | 3/2021 | Tabata | B60W 20/30 |
| 2021/0086752 A1* | 3/2021 | Tabata | B60W 10/06 |
| 2021/0087966 A1* | 3/2021 | Tabata | B60W 50/029 |
| 2021/0101583 A1* | 4/2021 | Omuro | B60K 6/383 |
| 2021/0107445 A1* | 4/2021 | Matsubara | B60K 6/365 |
| 2021/0107447 A1* | 4/2021 | Oh | B60W 20/11 |
| 2021/0107485 A1* | 4/2021 | Tabata | B60W 10/08 |
| 2021/0162980 A1* | 6/2021 | Echigo | B60W 10/06 |
| 2021/0229654 A1* | 7/2021 | Matsubara | B60W 10/08 |
| 2021/0317795 A1* | 10/2021 | Nakamura | F02D 41/0045 |

* cited by examiner

| TRAVEL MODE | | | | C1 | B1 | MG1 | MG2 |
|---|---|---|---|---|---|---|---|
| EV | FORWARD/ REVERSE | SINGLE-MOTOR DRIVE | DRIVE | | | G | M |
| | | | USE IN COMBINATION WITH ENGINE BRAKE | △ | △ | G | M |
| | | TWO-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |

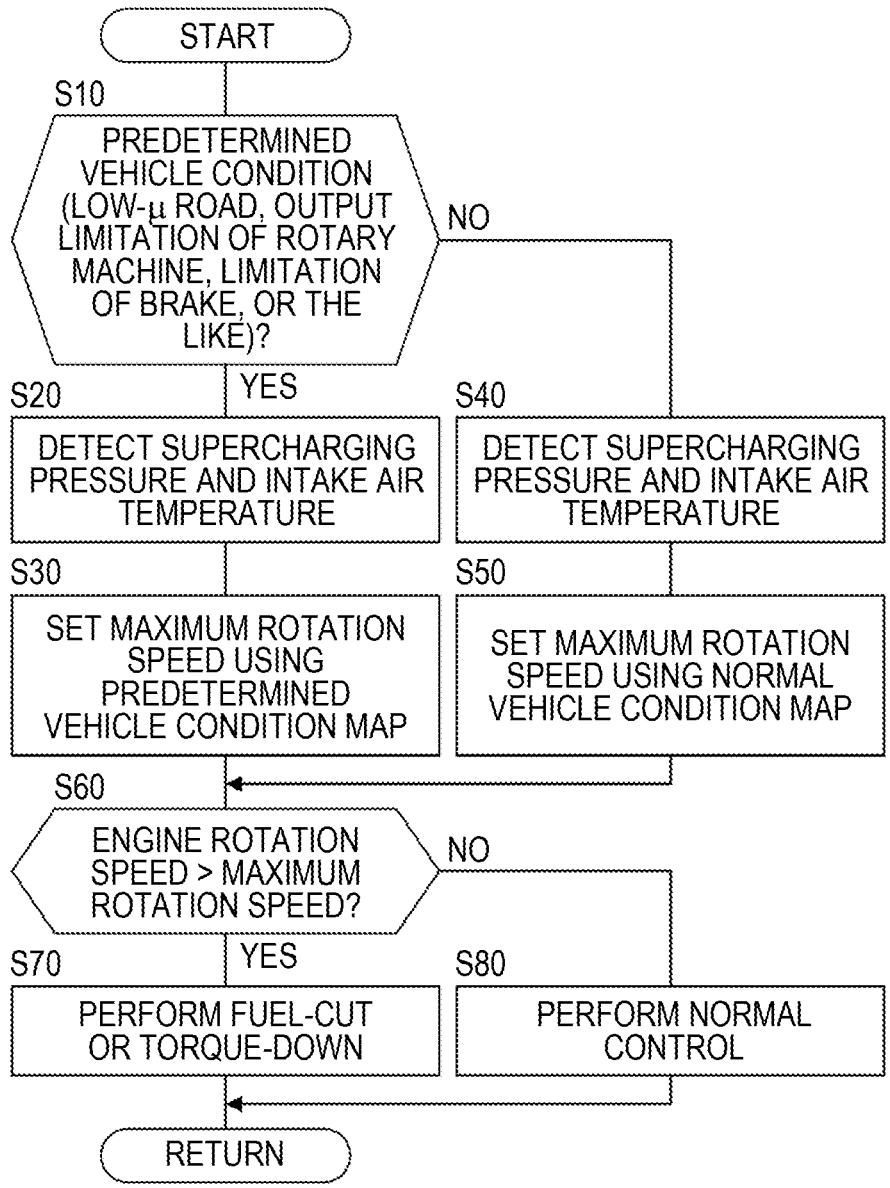

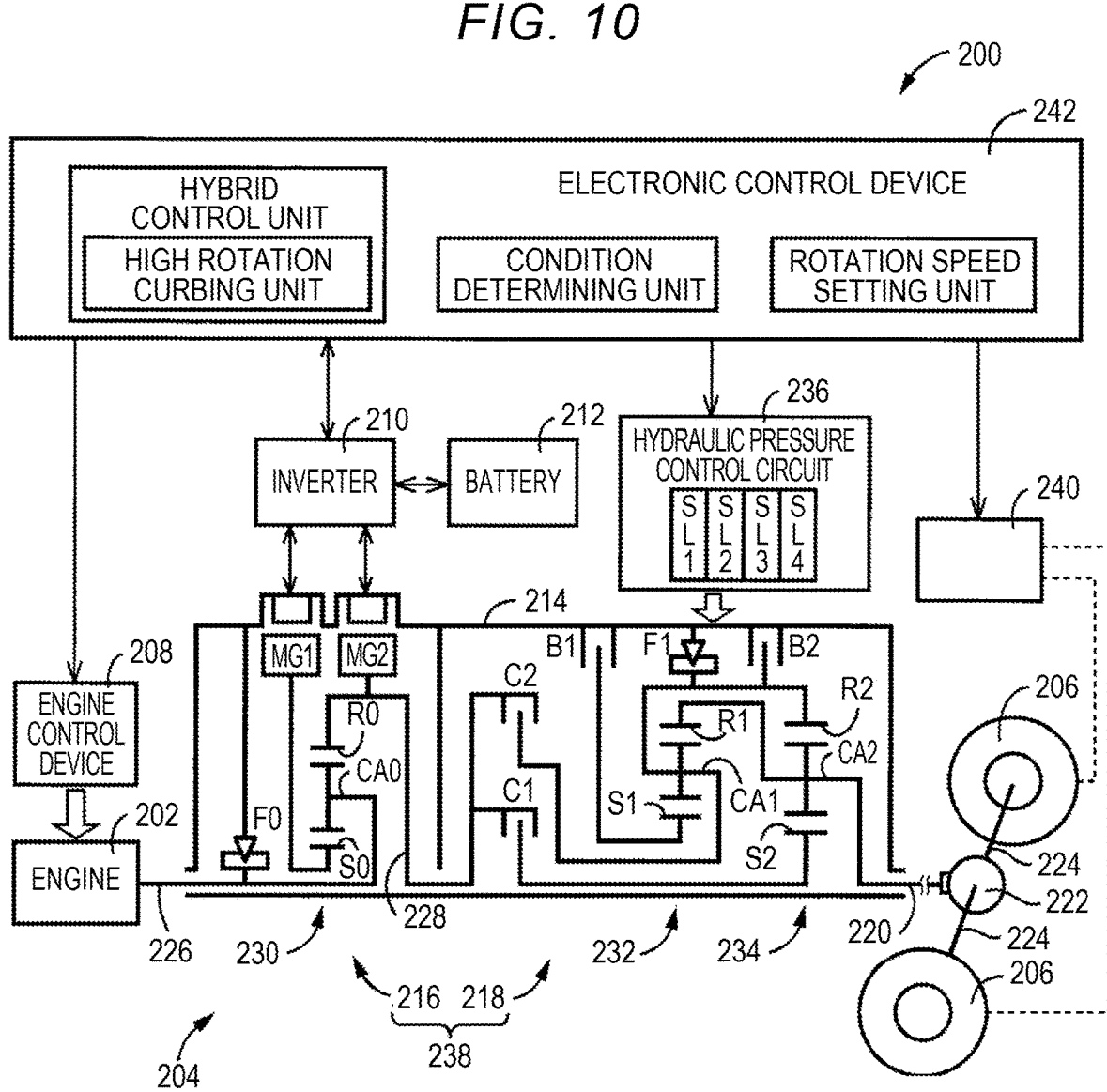

CONTROL DEVICE FOR HYBRID VEHICLE

CROSS-REFERENCE TO RELATED APPLICATION

This application claims priority to Japanese Patent Application No. 2019-172307 filed on Sep. 20, 2019, incorporated herein by reference in its entirety.

BACKGROUND

1. Technical Field

The present disclosure relates to a control device for a hybrid vehicle including an engine with a supercharger and a rotary machine.

2. Description of Related Art

A control device for a hybrid vehicle including an engine and a rotary machine that can adjust a rotation speed of the engine is well known. An example thereof is a vehicle which is described in Japanese Unexamined Patent Application Publication No. 2008-247205 (JP 2008-247205 A). JP 2008-247205 A discloses that an engine and a rotary machine are controlled such that the rotation speed of the engine is within a range not exceeding a maximum rotation speed which is determined not to exceed predetermined upper-limit rotation speeds thereof and an output required for the engine is output from the engine.

SUMMARY

Even when the engine and the rotary machine are controlled as in the technique described in JP 2008-247205 A, the engine rotation speed of the engine may increase to be higher than the maximum rotation speed depending on vehicle conditions. In this case, decreasing an output torque of the engine can be considered. However, when the engine includes a supercharger, a response delay of the output torque of the engine may occur due to a response delay of the supercharging pressure. Accordingly, even when the engine is controlled such that the output torque of the engine is decreased, the rotation speed of the engine may be likely to fall into a high-rotation state as the rotation speed of the engine or the rotation speed of the rotary machine becomes closer to the predetermined upper-limit rotation speed thereof.

The present disclosure provides a control device for a hybrid vehicle that can curb a decrease in power performance due to a decrease in an output torque of an engine and prevent a rotation speed of an engine from falling into a high-rotation state.

According to a first aspect of the present disclosure, there is provided a control device for (a) a hybrid vehicle including an engine with a supercharger and a rotary machine that is able to adjust a rotation speed of the engine, the control device including: (b) a high rotation curbing unit configured to control the engine and the rotary machine such that an operating point of the engine reaches a target operating point which is set such that the rotation speed of the engine is within a range which does not exceed a maximum rotation speed with a margin of the rotation speed of the engine from a predetermined upper-limit rotation speed of each of the engine and the rotary machine and an output required for the engine is output from the engine and to control the engine such that an output torque of the engine decreases when the rotation speed of the engine exceeds the maximum rotation speed; and (c) a rotation speed setting unit configured to set the maximum rotation speed to a lower value when a supercharging pressure from the supercharger is high than when the supercharging pressure is low.

A second aspect of the present disclosure provides the control device for a hybrid vehicle according to the first aspect, wherein the rotation speed setting unit is configured to set the maximum rotation speed to a lower value as the supercharging pressure becomes higher.

A third aspect of the present disclosure provides the control device for a hybrid vehicle according to the first or second aspect, wherein the rotation speed setting unit is configured to set the maximum rotation speed to a lower value when a temperature of intake air of the engine is low than when the temperature of intake air is high.

A fourth aspect of the present disclosure provides the control device for a hybrid vehicle according to the third aspect, wherein the rotation speed setting unit is configured to set the maximum rotation speed to a lower value as the temperature of intake air of the engine becomes lower.

A fifth aspect of the present disclosure provides the control device for a hybrid vehicle according to any one of the first to fourth aspects, further including a condition determining unit configured to determine whether a vehicle condition is a predetermined vehicle condition in which the rotation speed of the engine or the rotation speed of the rotary machine is likely to reach a predetermined upper-limit rotation speed, wherein the rotation speed setting unit is configured to set the maximum rotation speed to a lower value when it is determined that the vehicle condition is the predetermined vehicle condition than when it is determined that the vehicle condition is not the predetermined vehicle condition.

A sixth aspect of the present disclosure provides the control device for a hybrid vehicle according to the fifth aspect, wherein the condition determining unit is configured to determine whether the vehicle condition is the predetermined vehicle condition based on whether the hybrid vehicle is traveling on a road on which driving wheels to which power of the engine is transmitted are likely to slip.

A seventh aspect of the present disclosure provides the control device for a hybrid vehicle according to the fifth or sixth aspect, wherein the condition determining unit is configured to determine whether the vehicle condition is the predetermined vehicle condition based on whether the rotary machine is subjected to a predetermined output limitation.

An eighth aspect of the present disclosure provides the control device for a hybrid vehicle according to the seventh aspect, wherein the condition determining unit is configured to determine that the rotary machine is subjected to the predetermined output limitation when the temperature of the rotary machine or a temperature of a power storage device that transmits and receives electric power to and from the rotary machine is outside of a predetermined normal temperature area thereof.

A ninth aspect of the present disclosure provides the control device for a hybrid vehicle according to any one of the fifth to eighth aspects, wherein the condition determining unit is configured to determine whether the vehicle condition is the predetermined vehicle condition based on whether a braking operation of a brake device that applies a wheel brake torque to the driving wheels to which the power of the engine is transmitted is limited.

According to the first aspect, when the supercharging pressure from the supercharger is high, the engine rotation speed is likely to fall into a high-rotation state as the rotation speed of the engine or the rotation speed of the rotary machine approaches the predetermined upper-limit rotation speed thereof due to a response delay of the supercharging pressure, but the maximum rotation speed is set to a lower value in comparison with the supercharging pressure is low. Accordingly, the output torque of the engine is decreased at a relatively low rotation speed of the engine and the rotation speed of the engine is less likely to fall into a high-rotation state. Since the maximum rotation speed is set to a relatively high value when the supercharging pressure is relatively low and the rotation speed of the engine is less likely to fall into a high-rotation state, the output torque of the engine is not decreased at a relatively high rotation speed of the engine and power performance can be easily secured. As a result, it is possible to curb a decrease in power performance due to a decrease in the output torque of the engine and to prevent the rotation speed of the engine from falling into a high-rotation state.

According to the second aspect, the maximum rotation speed is set to a lower value as the supercharging pressure becomes higher. Accordingly, the rotation speed of the engine is less likely to fall into a high-rotation state appropriately when the supercharging pressure is relatively high, and power performance can be easily secured appropriately when the supercharging pressure is relatively low.

According to the third aspect, when the temperature of intake air of the engine is low, the output torque of the engine increases and thus the rotation speed of the engine is likely to fall into a high-rotation state but the maximum rotation speed is set to a lower value than when the temperature of intake air is high. Accordingly, the output torque of the engine is decreased at a relatively low rotation speed of the engine and the rotation speed of the engine is less likely to fall into a high-rotation state.

According to the fourth aspect, since the maximum rotation speed is set to a lower value as the temperature of intake air of the engine becomes lower, the rotation speed of the engine is less likely to fall into a high-rotation state appropriately.

According to the fifth aspect, since the maximum rotation speed is set to a lower value when it is determined that the vehicle condition is a predetermined vehicle condition in which the rotation speed of the engine or the rotation speed of the rotary machine is likely to reach a predetermined upper-limit rotation speed thereof than when it is determined that the vehicle condition is not the predetermined vehicle condition, the output torque of the engine is decreased at a relatively low rotation speed of the engine and the rotation speed of the engine is less likely to fall into a high-rotation state.

According to the sixth aspect, when the hybrid vehicle is traveling on a road on which the driving wheels are likely to slip, it is determined that the vehicle condition is the predetermined vehicle condition and thus the rotation speed of the engine is less likely to fall into a high-rotation state.

According to the seventh aspect, when the rotary machine is subjected to a predetermined output limitation, it is determined that the vehicle condition is the predetermined vehicle condition and thus the rotation speed of the engine is less likely to fall into a high-rotation state.

According to the eighth aspect, when the temperature of the rotary machine or the temperature of the power storage device is out of a predetermined normal temperature area, it is determined that the rotary machine is subjected to the predetermined output limitation and thus the rotation speed of the engine is less likely to fall into a high-rotation state.

According to the ninth aspect, when the braking operation of the brake device is limited, it is determined that the vehicle condition is the predetermined vehicle condition and thus the rotation speed of the engine is less likely to fall into a high-rotation state.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 9 is a flowchart illustrating a principal part of a control operation of an electronic control unit and illustrating a control operation for curbing a decrease in power performance due to a decrease in an engine torque and preventing an engine rotation speed from falling into a high-rotation state;

FIG. 10 is a diagram schematically illustrating a configuration of a vehicle to which the present disclosure is applied and which is different from the vehicle illustrated in FIG. 1;

FIG. 11 is an operation table illustrating a relationship between combinations of a gear shifting operation of a mechanical stepped gear shifting unit illustrated in FIG. 10 and operations of engagement devices which are used therein;

DETAILED DESCRIPTION OF EMBODIMENTS

Hereinafter, embodiments of the present disclosure will be described in detail with reference to the accompanying drawings.

Figure 1:
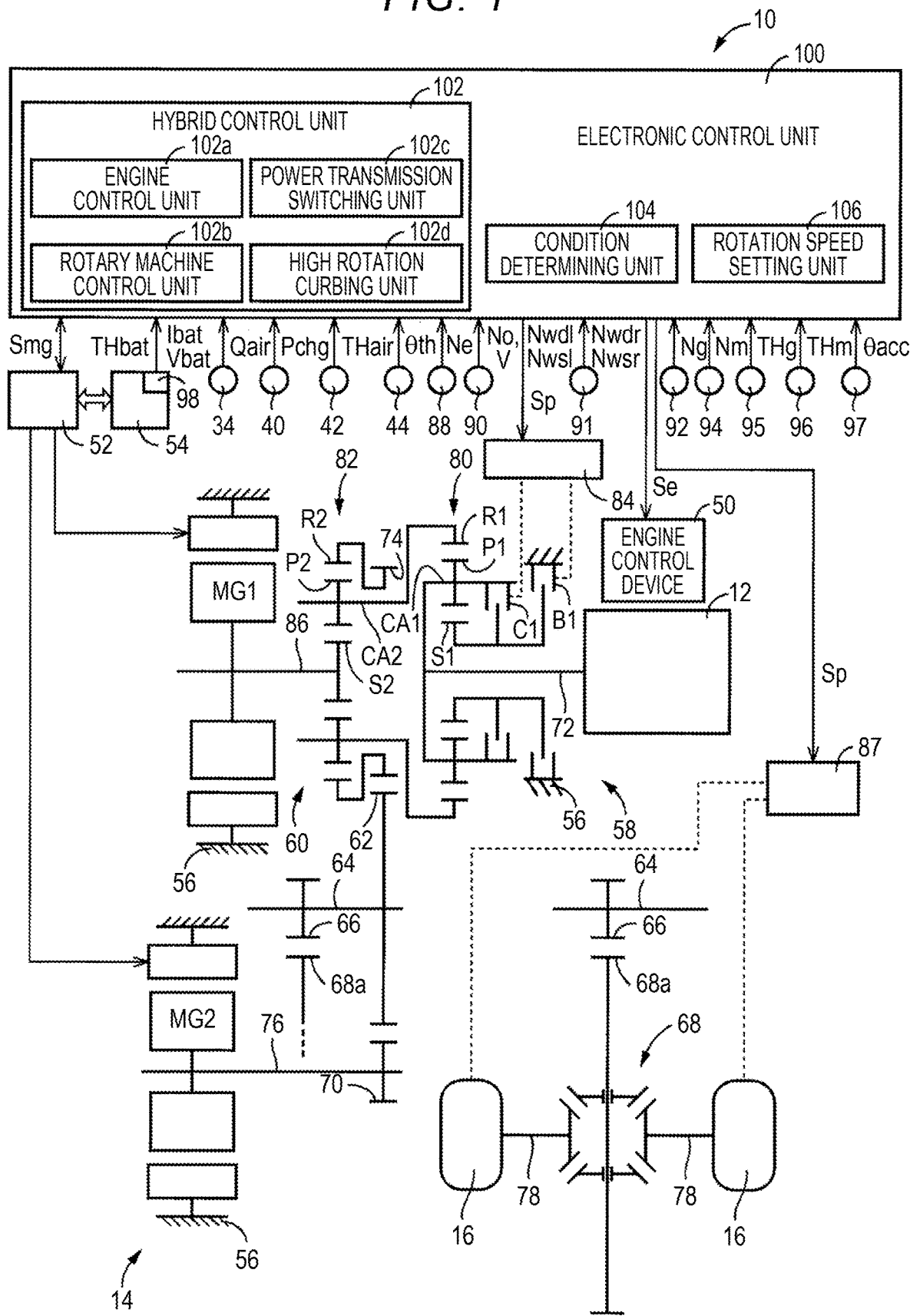
FIG. 1 is a diagram schematically illustrating a configuration of a vehicle to which the present disclosure is applied and illustrating principal parts of a control function and a control system for various types of control in the vehicle.

FIG. 1 is a diagram schematically illustrating a configuration of a vehicle 10 to which the present disclosure is applied and illustrating principal parts of a control function and a control system for various types of control in the vehicle 10. In FIG. 1, the vehicle 10 is a hybrid vehicle including an engine 12, a first rotary machine MG1, a second rotary machine MG2, a power transmission device 14, and driving wheels 16.

Figure 2:
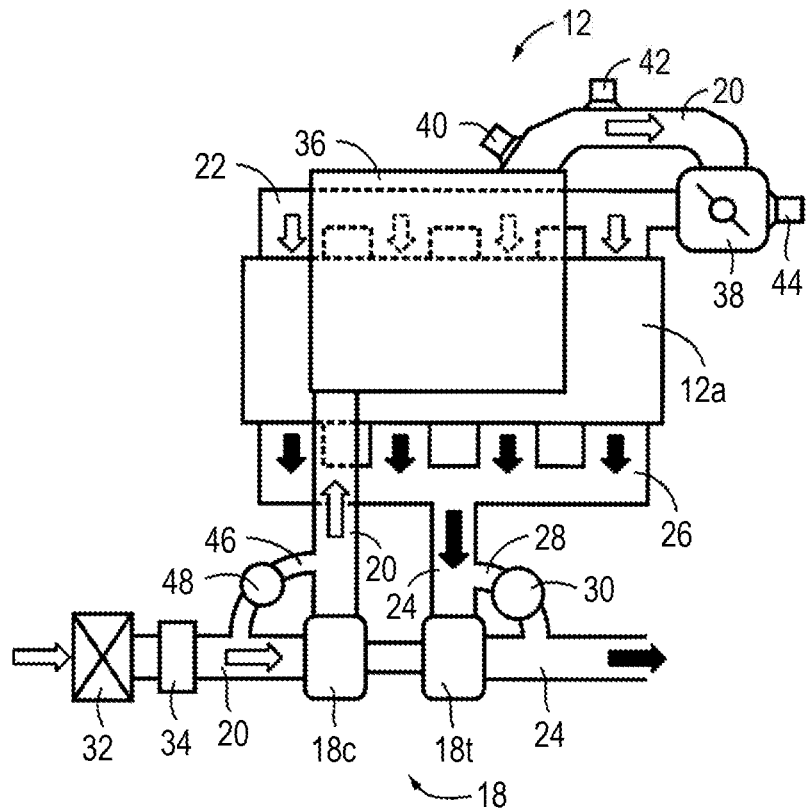
FIG. 2 is a diagram schematically illustrating a configuration of an engine.

FIG. 2 is a diagram schematically illustrating a configuration of the engine 12. In FIG. 2, the engine 12 is a power source for travel of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust-turbine supercharger, that is, a turbocharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

An exhaust bypass 28 that causes exhaust gas to flow from upstream to downstream with respect to the turbine 18t by bypassing the turbine 18t is provided in parallel in the exhaust pipe 24. A waste gate valve (=WGV) 30 that continuously controls a ratio of exhaust gas passing through the exhaust bypass 28 to exhaust gas passing through the turbine 18t is provided in the exhaust bypass 28. A valve opening of the waste gate valve 30 is continuously adjusted by causing an electronic control unit 100 which will be described later to operate an actuator which is not illustrated. As the valve opening of the waste gate valve 30 increases, exhaust gas of the engine 12 is more likely to be discharged via the exhaust bypass 28. Accordingly, in a supercharged state of the engine 12 in which a supercharging operation of the supercharger 18 is effective, a supercharging pressure Pchg from the supercharger 18 decreases as the valve opening of the waste gate valve 30 increases. The supercharging pressure Pchg from the supercharger 18 is a pressure of intake air and is an air pressure downstream from the compressor 18c in the intake pipe 20. A side in which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects the supercharging pressure Pchg from the supercharger 18 and an intake air temperature sensor 42 that detects an intake air temperature THair which is the temperature of intake air are provided in the intake pipe 20 between the intercooler 36 and the electronic throttle valve 38. A throttle valve opening sensor 44 that detects a throttle valve opening θth which is an opening of the electronic throttle valve 38 is provided in the vicinity of the electronic throttle valve 38, for example, in the throttle actuator.

An air recirculation bypass 46 that causes air to recirculate from downstream to upstream with respect to the compressor 18c by bypassing the compressor 18c is provided in parallel in the intake pipe 20. For example, an air bypass valve (=ABV) 48 that is opened at the time of sudden closing of the electronic throttle valve 38 to curb occurrence of a surge and to protect the compressor 18c is provided in the air recirculation bypass 46.

In the engine 12, an engine torque Te which is an output torque of the engine 12 is controlled by causing the electronic control unit 100 which will be described later to control an engine control device 50 (see FIG. 1) including the electronic throttle valve 38, a fuel injection device, an ignition device, and the waste gate valve 30.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as a power source for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 100 which will be described later to control the inverter 52. For example, in the case of forward rotation, an output torque of a rotary machine is a powering torque at a positive torque which is an acceleration side and is a regenerative torque at a negative torque which is a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

The power transmission device 14 includes a gear shifting unit 58, a differential unit 60, a driven gear 62, a driven shaft 64, a final gear 66, a differential device 68, and a reduction gear 70 in the case 56. The gear shifting unit 58 and the differential unit 60 are arranged coaxially with an input shaft 72 which is an input rotary member of the gear shifting unit 58. The gear shifting unit 58 is connected to the engine 12 via the input shaft 72 or the like. The differential unit 60 is connected in series to the gear shifting unit 58. The driven gear 62 engages with a drive gear 74 which is an output rotary member of the differential unit 60. The driven shaft 64 fixes the driven gear 62 and the final gear 66 such that they cannot rotate relative to each other. The final gear 66 has a smaller diameter than the driven gear 62. The differential device 68 engages with the final gear 66 via a differential ring gear 68a. The reduction gear 70 has a smaller diameter than the driven gear 62 and engages with the driven gear 62. A rotor shaft 76 of the second rotary machine MG2 which is disposed in parallel to the input shaft 72 is connected to the reduction gear 70 separately from the input shaft 72 and the reduction gear 70 is connected to the second rotary machine MG2 in a power-transmittable manner. The power transmission device 14 includes an axle 78 that is connected to the differential device 68.

The power transmission device 14 having this configuration is suitably used for a vehicle of a front-engine front-drive (FF) type or a rear-engine rear-drive (RR) type. In the power transmission device 14, power which is output from the engine 12, the first rotary machine MG1, and the second rotary machine MG2 is transmitted to the driven gear 62 and is transmitted from the driven gear 62 to the driving wheels 16 sequentially via the final gear 66, the differential device 68, the axle 78, and the like. In this way, the second rotary machine MG2 is a rotary machine that is connected to the driving wheels 16 in a power-transmittable manner. In the power transmission device 14, the engine 12, the gear shifting unit 58, the differential unit 60, and the first rotary machine MG1, and the second rotary machine MG2 are arranged on different axes, whereby a shaft length is decreased. A reduction gear ratio of the second rotary machine MG2 can be set to be great. Power is synonymous with torque or force when not particularly distinguished.

The gear shifting unit 58 includes a first planetary gear mechanism 80, a clutch C1, and a brake B1. The differential unit 60 includes a second planetary gear mechanism 82. The first planetary gear mechanism 80 is a known single-pinion type planetary gear device including a first sun gear S1, a first pinion P1, a first carrier CA1 that supports the first pinion P1 such that it can rotate and revolve, and a first ring gear R1 that engages with the first sun gear S1 via the first pinion P1. The second planetary gear mechanism 82 is a known single-pinion type planetary gear device including a second sun gear S2, a second pinion P2, a second carrier CA2 that supports the second pinion P2 such that it can rotate and revolve, and a second ring gear R2 that engages with the second sun gear S2 via the second pinion P2.

In the first planetary gear mechanism 80, the first carrier CA1 is a rotary element that is integrally connected to the input shaft 72 and connected to the engine 12 via the input shaft 72 in a power-transmittable manner. The first sun gear S1 is a rotary element that is selectively connected to the case 56 via the brake B1. The first ring gear R1 is a rotary element that is connected to the second carrier CA2 of the second planetary gear mechanism 82 which is an input rotary member of the differential unit 60 and serves as an output rotary member of the gear shifting unit 58. The first carrier CA1 and the first sun gear S1 are selectively connected to each other via the clutch C1.

The clutch C1 and the brake B1 are wet frictional engagement devices and are multi-disc hydraulic frictional engagement devices of which engagement is controlled by a hydraulic actuator. In the clutch C1 and the brake B1, operating states such as an engaged state and a disengaged state are switched based on regulated hydraulic pressures Pc1 and Pb1 which are output from a hydraulic pressure control circuit 84 provided in the vehicle 10 by causing the electronic control unit 100 which will be described later to control the hydraulic pressure control circuit 84 provided in the vehicle 10.

In a state in which both the clutch C1 and the brake B1 are disengaged, a differential motion of the first planetary gear mechanism 80 is permitted. Accordingly, in this state, since a reaction torque of the engine torque Te is not taken in the first sun gear S1, the gear shifting unit 58 is in a neutral state in which mechanical power transmission is not possible, that is, a neutral state. In a state in which the clutch C1 is engaged and the brake B1 is disengaged, the rotary elements of the first planetary gear mechanism 80 rotate integrally. Accordingly, in this state, rotation of the engine 12 is transmitted from the first ring gear R1 to the second carrier CA2 at a constant speed. On the other hand, in a state in which the clutch C1 is disengaged and the brake B1 is engaged, rotation speed of the first sun gear S1 of the first planetary gear mechanism 80 is prohibited and rotation of the first ring gear R1 is increased to be higher than rotation of the first carrier CA1. Accordingly, in this state, rotation of the engine 12 is increased and output from the first ring gear R1. In this way, the gear shifting unit 58 serves as a two-stage stepped transmission which is switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 80 is prohibited. Accordingly, in this state, rotation of the first ring gear R1 which is the output rotary member of the gear shifting unit 58 is stopped and thus rotation of the second carrier CA2 which is the input rotary member of the differential unit 60 is stopped.

In the second planetary gear mechanism 82, the second carrier CA2 is a rotary element that is connected to the first ring gear R1 which is the output rotary member of the gear shifting unit 58 and serves as an input rotary member of the differential unit 60. The second sun gear S2 is a rotary element that is integrally connected to the rotor shaft 86 of the first rotary machine MG1 and is connected to the first rotary machine MG1 in a power-transmittable manner. The second ring gear R2 is a rotary element that is integrally connected to the drive gear 74 and is connected to the driving wheels 16 in a power-transmittable manner and serves as an output rotary member of the differential unit 60. The second planetary gear mechanism 82 is a power split mechanism that mechanically splits power of the engine 12 which is input to the second carrier CA2 via the gear shifting unit 58 to the first rotary machine MG1 and the drive gear 74. That is, the second planetary gear mechanism 82 is a differential mechanism that splits and transmits power of the engine 12 to the driving wheels 16 and the first rotary machine MG1. In the second planetary gear mechanism 82, the second carrier CA2 serves as an input element, the second sun gear S2 serves as a reaction element, and the second ring gear R2 serves as an output element. The differential unit 60 constitutes an electrical gear shifting mechanism, for example, an electrical stepless transmission, in which a differential state of the second planetary gear mechanism 82 is controlled by controlling the operating state of the first rotary machine MG1 along with the first rotary machine MG1 that is connected to the second planetary gear mechanism 82 in a power-transmittable manner. The first rotary machine MG1 is a rotary machine to which power of the engine 12 is transmitted. Since the gear shifting unit 58 is in overdrive, an increase in torque of the first rotary machine MG1 is curbed. Controlling the operating state of the first rotary machine MG1 refers to performing operation control of the first rotary machine MG1.

Figure 3:
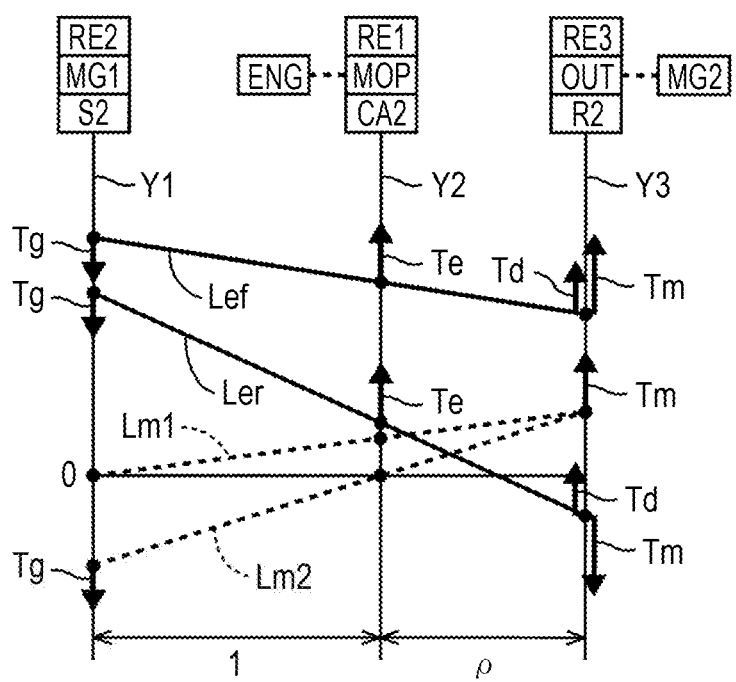
FIG. 3 is a collinear diagram relatively illustrating rotation speeds of rotary elements in a differential unit.

FIG. 3 is a collinear diagram illustrating rotation speeds of the rotary elements in the differential unit 60 relative to each other. In FIG. 3, three vertical lines Y1, Y2, and Y3 correspond to three rotary elements of the second planetary gear mechanism 82 constituting the differential unit 60. The vertical line Y1 represents the rotation speed of the second sun gear S2 which is a second rotary element RE2 connected to the first rotary machine MG1 (see "MG1" in the drawing). The vertical line Y2 represents the rotation speed of the second carrier CA2 which is a first rotary element RE1 connected to the engine 12 (see "ENG" in the drawing) via the gear shifting unit 58. The vertical line Y3 represents the rotation speed of the second ring gear R2 which is a third rotary element RE3 integrally connected to the drive gear 74 (see "OUT" in the drawing). The second rotary machine MG2 (see "MG2" in the drawing) is connected to the driven gear 62 engaging with the drive gear 74 via the reduction gear 70 or the like. A mechanical oil pump (see "MOP" in the drawing) which is provided in the vehicle 10 is connected to the second carrier CA2. This mechanical oil pump is operated with rotation of the second carrier CA2 to supply oil which is used for engaging operations of the clutch C1 and the brake B1, lubrication of the parts, and cooling of the parts. When rotation of the second carrier CA2 is stopped, the oil is supplied by an electrical oil pump (not illustrated) which is provided in the vehicle 10. The gaps between the vertical lines Y1, Y2, and Y3 are determined according to a gear ratio ρ (=number of teeth of the sun gear/number of teeth of the ring gear) of the second planetary gear mechanism 82. In the relationship between the vertical axes in the collinear diagram, when the gap between a sun gear and a carrier corresponds to "1," the gap between the carrier and a ring gear corresponds to the gear ratio ρ.

A solid line Lef in FIG. 3 denotes an example of relative speeds of the rotary elements at the time of forward travel in a hybrid travel (=HV travel) mode in which hybrid travel using at least the engine 12 as a power source is possible. A solid line Ler in FIG. 3 denotes an example of relative speeds of the rotary elements at the time of reverse travel in the HV travel mode. In the HV travel mode, in the second planetary gear mechanism 82, for example, when an MG1 torque Tg which is a reaction torque and a negative torque of the first rotary machine MG1 with respect to an engine torque Te that is a positive torque which is input to the second carrier CA2 via the gear shifting unit 58 is input to the second sun gear S2, a direct engine-transmitted torque Td which is a positive torque appears in the second ring gear R2. For example, when the MG1 torque Tg (=−ρ/(1+ρ)×Te) which is a reaction torque with respect to the engine torque Te that is a positive torque which is input to the second carrier CA2 is input to the second sun gear S2 in a state in which the clutch C1 is engaged, the brake B1 is disengaged, and the gear shifting unit 58 is in a directly coupled state with a gear ratio of "1.0," a direct engine-transmitted torque Td (=Te/(1+ρ)=−(1/ρ)×Tg) appears in the second ring gear R2. A combined torque of the direct engine-transmitted torque Td and the MG2 torque Tm which are transmitted to the driven gear 62 can be transmitted as a drive torque of the vehicle 10 to the driving wheels 16 according to a required driving force. The first rotary machine MG1 serves as a power generator when a negative torque is generated at the time of positive rotation. A generated electric power Wg of the first rotary machine MG1 charges the battery 54 or is consumed in the second rotary machine MG2. The second rotary machine MG2 outputs the MG2 torque Tm using all or some of the generated electric power Wg or electric power from the battery 54 in addition to the generated electric power Wg. The MG2 torque Tm at the time of forward travel is a powering torque which is a positive torque at the time of forward rotation, and the MG2 torque Tm at the time of reverse travel is a powering torque which is a negative torque at the time of reverse rotation.

The differential unit 60 can operate as an electrical stepless transmission. For example, in the HV travel mode, when the rotation speed of the first rotary machine MG1, that is, the rotation speed of the second sun gear S2, increases or decreases with respect to an output rotation speed No which is the rotation speed of the drive gear 74 which is constrained on rotation of the driving wheels 16 by controlling the operating state of the first rotary machine MG1, the rotation speed of the second carrier CA2 increases or decreases. Since the second carrier CA2 is connected to the engine 12 via the gear shifting unit 58, an engine rotation speed Ne which is the rotation speed of the engine 12 increases or decreases with the increase or decrease in the rotation speed of the second carrier CA2. Accordingly, in the HV travel, it is possible to perform control such that an engine operating point OPeng is set to an efficient operating point. This hybrid type is referred to as a mechanical split type or a split type. The first rotary machine MG1 is a rotary machine that can control the engine rotation speed Ne, that is, a rotary machine that can adjust the engine rotation speed Ne. An operating point is an operation point which is expressed by a rotation speed and a torque, and the engine operating point OPeng is an operation point of the engine 12 which is expressed by the engine rotation speed Ne and the engine torque Te.

A dotted line Lm1 in FIG. 3 represents an example of relative speeds of the rotary elements at the time of forward travel in a single-motor-driven EV mode in which motor-driven travel using only the second rotary machine MG2 as a power source is possible in a motor-driven travel (=EV travel) mode. A dotted line Lm2 in FIG. 3 represents an example of relative speeds of the rotary elements at the time of forward travel in a two-motor-driven EV mode in which motor-driven travel using both the first rotary machine MG1 and the second rotary machine MG2 as a power source is possible in the EV travel mode. The EV travel mode is a travel mode in which motor-driven travel using at least one of the first rotary machine MG1 and the second rotary machine MG2 as a power source in a state in which operation of the engine 12 is stopped is possible.

In the single-motor-driven EV mode, when both the clutch C1 and the brake B1 are disengaged and the gear shifting unit 58 falls into a neutral state, the differential unit 60 also falls into a neutral state. In this state, the MG2 torque Tm can be transmitted as a drive torque of the vehicle 10 to the driving wheels 16. In the single-motor-driven EV mode, for example, the first rotary machine MG1 is maintained at zero rotation in order to reduce a drag loss in the first rotary machine MG1. For example, even when control is performed such that the first rotary machine MG1 is maintained at zero rotation, the differential unit 60 is in the neutral state and thus the drive torque is not affected.

In the two-motor-driven EV mode, when both the clutch C1 and the brake B1 are engaged and rotation of the rotary elements of the first planetary gear mechanism 80 is prohibited, the second carrier CA2 is stopped at zero rotation. In this state, the MG1 torque Tg and the MG2 torque Tm can be transmitted as the drive torque of the vehicle 10 to the driving wheels 16.

Referring back to FIG. 1, the vehicle 10 further includes a wheel brake device 87 which is a brake device that applies a wheel brake torque (=brake torque) to vehicle wheels (the driving wheels 16 and driven wheels which are not illustrated). The wheel brake device 87 supplies a brake oil pressure (=braking oil pressure) to a wheel cylinder which is provided in a wheel brake according to a driver's braking operation (for example, an operation of a brake pedal). In the wheel brake device 87, a brake fluid pressure (=master cylinder oil pressure) with a magnitude which corresponds to a depression force of the brake pedal and which is generated by a brake master cylinder is directly supplied as a braking oil pressure to the wheel cylinder in a normal state. On the other hand, in the wheel brake device 87, a braking oil pressure required for various types of control is supplied to the wheel cylinder separately from the braking oil pressure corresponding to the depression force at the time of control such as that of an anti-lock brake system (ABS), traction control (TRC), or vehicle stability control (VSC). An ABS is a system that controls braking oil pressures of the wheels to prevent locking of the wheels in order to secure stability of the vehicle 10 at the time of braking due to a sudden braking operation or at the time of braking on a slippery road. TRC is a system that controls a braking oil pressure and a driving force of the driving wheels 16 such that slippage of the driving wheels 16 is curbed and a driving force based on a road condition is secured in order to secure stability of the vehicle 10 at the time of starting/accelerating on a slippery road or at the time of accelerating while turning. VSC is a system that controls a braking oil pressure and a drive power of each wheel such that rear-wheel skid or front-wheel skid is reduced in order to secure stability in a turning direction of the vehicle 10.

The vehicle 10 further includes an electronic control unit 100 serving as a controller including control devices for the vehicle 10 associated with control of the engine 12, the first rotary machine MG1, the second rotary machine MG2, and the like. For example, the electronic control unit 100 is configured to include a so-called microcomputer including a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity.

The electronic control unit 100 is supplied with various signals (for example, an intake air amount Qair, a supercharging pressure Pchg, an intake air temperature THair, a throttle valve opening θth, an engine rotation speed Ne, an output rotation speed No corresponding to a vehicle speed V, wheel speeds Nwdl, Nwdr, Nwsl, and Nwsr which are wheel speeds Nw of the right and left driving wheels 16 and right and left driven wheels which are not illustrated, an MG1 rotation speed Ng which is the rotation speed of the first rotary machine MG1, an MG2 rotation speed Nm which is the rotation speed of the second rotary machine MG2, an MG1 temperature THg which is a temperature of the first rotary machine MG1, for example, a stator temperature, an MG2 temperature THm which is a temperature of the second rotary machine MG2, for example, a stator temperature, an accelerator opening θacc which is an accelerator operation amount by a driver indicating the magnitude of the driver's acceleration operation, a battery temperature THbat which is a temperature of the battery 54, a battery charging/discharging current Ibat, and a battery voltage Vbat) based on detection values from various sensors (for example, an air flowmeter 34, a supercharging pressure sensor 40, an intake air temperature sensor 42, a throttle valve opening sensor 44, an engine rotation speed sensor 88, an output rotation speed sensor 90, wheel speed sensors 91, an MG1 rotation speed sensor 92, an MG2 rotation speed sensor 94, an MG1 temperature sensor 95, an MG2 temperature sensor 96, an accelerator opening sensor 97, and a battery sensor 98) which are provided in the vehicle 10. The electronic control unit 100 outputs various command signals (for example, an engine control command signal Se for controlling the engine 12, a rotary machine control command signal Smg for controlling the first rotary machine MG1 and the second rotary machine MG2, a hydraulic pressure control command signal Sp for controlling the operating states of the clutch C1 and the brake B1, a wheel brake control command signal Sb for controlling a wheel brake torque) to various devices (for example, the engine control device 50, the inverter 52, the hydraulic pressure control circuit 84, and the wheel brake device 87) which are provided in the vehicle 10.

The electronic control unit 100 calculates a state of charge (SOC) value SOC [%] which is a value indicating the state of charge of the battery 54, for example, based on the battery charging/discharging current Ibat and the battery voltage Vbat. The electronic control unit 100 calculates chargeable and dischargeable powers Win and Wout for defining a feasible range of a battery power Pbat which is the power of the battery 54, for example, based on the battery temperature THbat and the SOC value SOC of the battery 54. The chargeable and dischargeable powers Win and Wout include a chargeable power Win which is a possible input power for defining limitation of an input power of the battery 54 and a dischargeable power Wout which is a possible output power for defining limitation of an output power of the battery 54. For example, the chargeable and dischargeable powers Win and Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the SOC value SOC increases in an area in which the SOC value SOC is high. For example, the dischargeable power Wout decreases as the SOC value SOC decreases in an area in which the SOC value SOC is low.

The electronic control unit 100 includes a hybrid control means, that is, a hybrid control unit 102, that realizes various types of control in the vehicle 10.

The hybrid control unit 102 has a function of an engine control means, that is, an engine control unit 102*a*, that controls the operation of the engine 12, a function of a rotary machine control means, that is, a rotary machine control unit 102*b*, that controls the operations of the first rotary machine MG1 and the second rotary machine MG2 via the inverter 52, and a function of a power transmission switching means, that is, a power transmission switching unit 102*c*, that switches a power transmission state in the gear shifting unit 58, and performs hybrid drive control or the like using the engine 12, the first rotary machine MG1, and the second rotary machine MG2 based on such control functions.

The hybrid control unit 102 calculates a required drive torque Twdem which is a drive torque Tw required for the vehicle 10, for example, by applying the accelerator opening θacc and the vehicle speed V to a driving force map which is a relationship which is acquired and stored in advance by experiment or design, that is, a predetermined relationship. In other words, the required drive power Pwdem is a required drive torque Twdem at the vehicle speed V at that time. Here, the output rotation speed No or the like may be used instead of the vehicle speed V. As the driving force map, for example, a map for forward travel and a map for reverse travel are separately set.

The hybrid control unit 102 outputs an engine control command signal Se which is a command signal for controlling the engine 12 and a rotary machine control command signal Smg which is a command signal for controlling the first rotary machine MG1 and the second rotary machine MG2 such that the required drive power Pwdem is realized by at least one power source of the engine 12, the first rotary machine MG1, and the second rotary machine MG2 in consideration of a required charging/discharging power which is a charging/discharging power required for the battery 54 or the like.

For example, when the vehicle travels in the HV travel mode, the engine control command signal Se is a command value of an engine power Pe for outputting a target engine torque Tetgt at a target engine rotation speed Netgt in consideration of the optimal engine operating point OPengf and the like and realizing the required engine power Pedem in consideration of the required charging/discharging power, charging/discharging efficiency in the battery 54, and the like in addition to the required drive power Pwdem. The rotary machine control command signal Smg is a command value of a generated electric power Wg of the first rotary machine MG1 that outputs the MG1 torque Tg at the MG1 rotation speed Ng at the time of outputting a command as a reaction torque for causing the engine rotation speed Ne to reach a target engine rotation speed Netgt and is a command value of power consumption Wm of the second rotary machine MG2 that outputs the MG2 torque Tm at the MG2 rotation speed Nm at the time of outputting a command. For example, the MG1 torque Tg in the HV travel mode is calculated by feedback control in which the first rotary machine MG1 operates such that the engine rotation speed Ne reaches the target engine rotation speed Netgt. For example, the MG2 torque Tm in the HV travel mode is calculated such that the required drive torque Twdem is acquired by addition to a value corresponding to a drive torque Tw based on the engine direct-transmitted torque Td. The optimal engine operating point OPengf is determined in advance, for example, as an engine operating point OPeng at which total fuel efficiency in the vehicle 10 is the best in consideration of charging/discharging efficiency in the battery 54 in addition to the fuel efficiency of only the engine 12 when the required engine power Pedem is realized. The target engine rotation speed Netgt is a target value of the engine rotation speed Ne, that is, a target rotation speed of the engine 12, and the target engine torque Tetgt is a target value of the engine torque Te. The engine power Pe is an output, that is, power, of the engine 12 and the required engine power Pedem is an output required for the engine 12. In this way, the vehicle 10 is a vehicle in which the MG1 torque Tg which is a reaction torque of the first rotary machine MG1 is controlled such that the engine rotation speed Ne reaches the target engine rotation speed Netgt.

Figure 4:
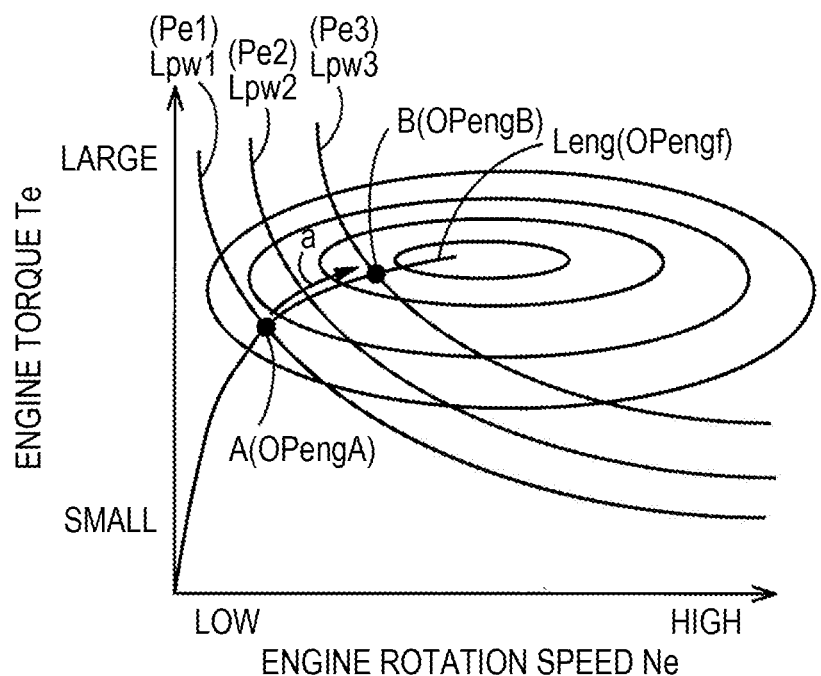
FIG. 4 is a diagram illustrating an example of an optimal engine operating point.

FIG. 4 is a diagram illustrating an example of the optimal engine operating point OPengf on a two-dimensional coordinate system with the engine rotation speed Ne and the engine torque Te as variables. In FIG. 4, a solid line Leng denotes a group of optimal engine operating points OPengf. Equi-power lines Lpw1, Lpw2, and Lpw3 denote examples in which the required engine power Pedem is required engine powers Pe1, Pe2, and Pe3, respectively. A point A is an engine operating point OPengA when the required engine power Pe1 is realized on the optimal engine operating point OPengf, and a point B is an engine operating point OPengB when the required engine power Pe3 is realized on the optimal engine operating point OPengf. The points A and B are also target values of the engine operating point OPeng which is expressed by the target engine rotation speed Netgt and the target engine torque Tetgt, that is, a target engine operating point OPengtgt which is a target operating point.

For example, when the target engine operating point OPengtgt changes from the point A to the point B with an increase in the accelerator opening Oacc, the engine operating point OPeng is controlled such that it changes on a path passing through the optimal engine operating points OPengf.

The hybrid control unit 102 selectively sets up the EV travel mode or the HV travel mode as the travel mode according to the travel conditions and causes the vehicle 10 to travel in the corresponding travel mode. For example, the hybrid control unit 102 sets up the EV travel mode in a motor-driven travel area in which the required drive power Pwdem is less than a predetermined threshold value, and sets up the HV travel mode in a hybrid travel area in which the required drive power Pwdem is equal to or greater than the predetermined threshold value. Even when the required drive power Pwdem is in the motor-driven travel area, the hybrid control unit 102 sets up the HV travel mode when the SOC value SOC of the battery 54 is less than a predetermined engine start threshold value or when warming-up of the engine 12 is necessary. The engine start threshold value is a predetermined threshold value for determining whether the SOC value SOC indicates that the battery 54 needs to be charged by forcibly starting the engine 12.

Figure 5:
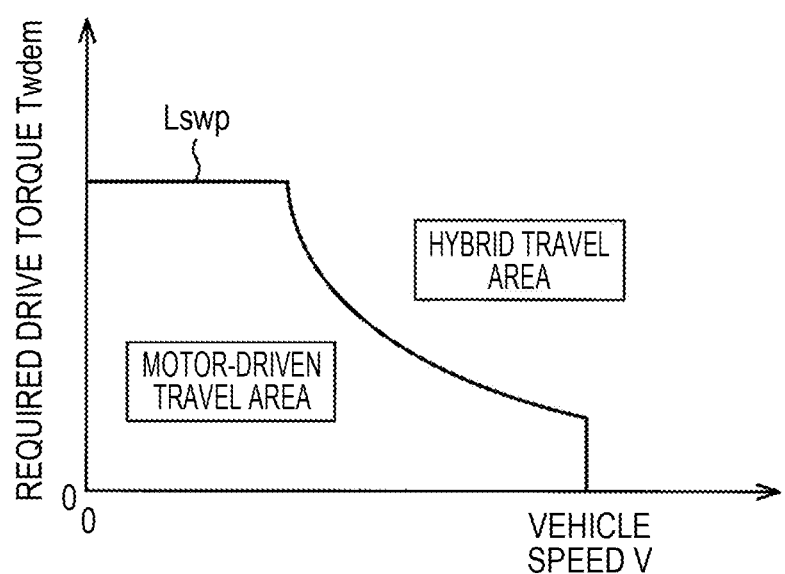
FIG. 5 is a diagram illustrating an example of a power source switching map which is used for switching control between motor-driven travel and hybrid travel.

FIG. 5 is a diagram illustrating an example of a power source switching map which is used for switching control between motor-driven travel and hybrid travel. In FIG. 5, a solid line Lswp is a boundary line between the motor-driven travel area and the hybrid travel area at which switching between the motor-driven travel and the hybrid travel is performed. An area in which the vehicle speed V is relatively low, the required drive torque Twdem is relatively small, and the required drive power Pwdem is relatively small is defined in advance in the motor-driven travel area. An area in which the vehicle speed V is relatively high, the required drive torque Twdem is relatively great, and the required drive power Pwdem is relatively great is defined in advance in the hybrid travel area. When the SOC value SOC of the battery 54 is less than the engine-start threshold value or when warming-up of the engine 12 is necessary, the motor-driven travel area in FIG. 5 may be changed to the hybrid travel area.

When the EV travel mode is set up and the required drive power Pwdem can be realized by only the second rotary machine MG2, the hybrid control unit 102 sets up a single-motor-driven EV mode. On the other hand, when the EV travel mode is set up and the required drive power Pwdem cannot be realized by only the second rotary machine MG2, the hybrid control unit 102 sets up a two-motor-driven EV mode. Although the required drive power Pwdem can be realized by only the second rotary machine MG2, the hybrid control unit 102 may set up the two-motor-driven EV mode when use of both the first rotary machine MG1 and the second rotary machine MG2 is more efficient than use of only the second rotary machine MG2.

The hybrid control unit 102 controls engagements of the clutch C1 and the brake B1 based on the set-up travel mode. The hybrid control unit 102 outputs a hydraulic pressure control command signal Sp for engaging and/or disengaging the clutch C1 and the brake B1 to the hydraulic pressure control circuit 84 such that transmission of power for travel in the set-up travel mode becomes possible.

Figures 6, 7:
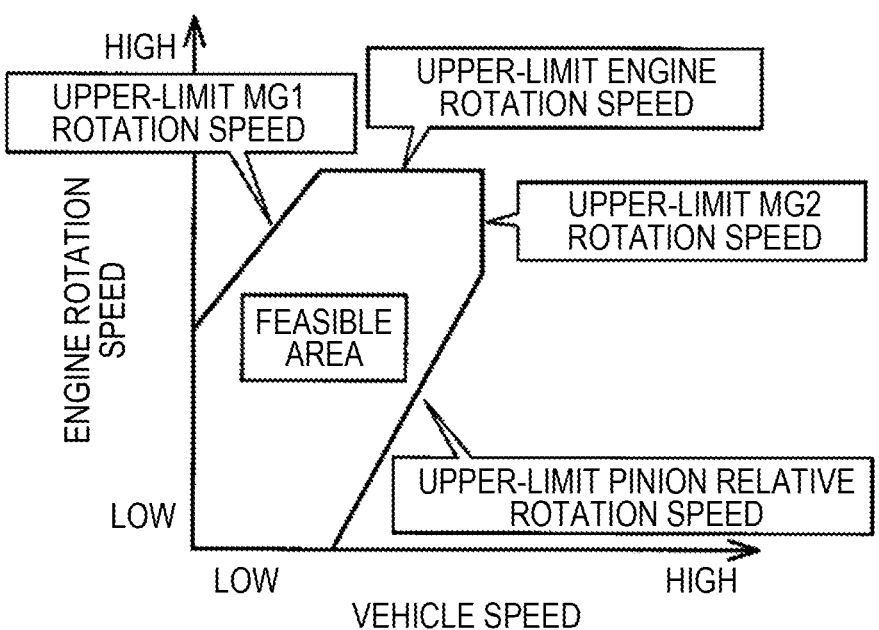
FIG. 6 is a table illustrating operating states of a clutch and a brake in each travel mode.
FIG. 7 is a diagram illustrating an example of a feasible area of an engine rotation speed.

FIG. 6 is a table illustrating operating states of the clutch C1 and the brake B1 in the travel modes. In FIG. 6, mark O denotes engagement of the clutch C1 and the brake B1, a blank denotes disengagement, and mark Δ denotes that one thereof is engaged at the time of additional use of an engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as a travel mode. The EV travel mode has two modes including the single-motor-driven EV mode and the two-motor-driven EV mode.

The single-motor-driven EV mode is realized in a state in which both the clutch C1 and the brake B1 are disengaged. In the single-motor-driven EV mode, the clutch C1 and the brake B1 are disengaged and thus the gear shifting unit 58 falls into a neutral state. When the gear shifting unit 58 falls into the neutral state, the differential unit 60 falls into a neutral state in which a reaction torque of the MG1 torque Tg is not taken in the second carrier CA2 connected to the first ring gar R1. In this state, the hybrid control unit 102 causes the second rotary machine MG2 to output the MG2 torque Tm for travel (see a dotted line Lm1 in FIG. 3). In the single-motor-driven EV mode, reverse travel may be performed by rotating the second rotary machine MG2 oppositely to the rotating direction at the time of forward travel.

In the single-motor-driven EV mode, since the first ring gear R1 is corotated with the second carrier CA2 but the gear shifting unit 58 is in the neutral state, the engine 12 is not corotated but is stopped with zero rotation. Accordingly, when regeneration control is performed in the second rotary machine MG2 during travel in the single-motor-driven EV mode, it is possible to take a large amount of regeneration. When the battery 54 is fully charged and regenerative energy is not taken during travel in the single-motor-driven EV mode, additional use of the engine brake can be considered. When the engine brake is used together, the brake B1 or the clutch C1 is engaged (see "use of engine brake together" in FIG. 6). When the brake B1 or the clutch C1 is engaged, the engine 12 is corotated and the engine brake operates.

The two-motor-driven EV mode is realized in a state in which both the clutch C1 and the brake B1 are engaged. In the two-motor-driven EV mode, since the clutch C1 and the brake B1 are engaged, rotation of the rotary elements of the first planetary gear mechanism 80 is stopped, the engine 12 is stopped with zero rotation, and rotation of the second carrier CA2 connected to the first ring gear R1 is stopped. When rotation of the second carrier CA2 is stopped, a reaction torque of the MG1 torque Tg is taken in the second carrier CA2, and thus the MG1 torque Tg can be mechanically output from the second ring gear R2 and be transmitted to the driving wheels 16. In this state, the hybrid control unit 102 causes the first rotary machine MG1 and the second rotary machine MG2 to output the MG1 torque Tg and the MG2 torque Tm for travel (see the dotted line Lm2 in FIG. 3). In the two-motor-driven EV mode, both the first rotary machine MG1 and the second rotary machine MG2 can be rotated oppositely to the rotating direction at the time of forward travel to allow reverse travel.

A low state of the HV travel mode is realized in a state in which the clutch C1 is engaged and the brake B1 is disengaged. In the low state of the HV travel mode, since the clutch C1 is engaged, the rotary elements of the first planetary gear mechanism 80 are integrally rotated and the gear shifting unit 58 falls into a directly coupled state. Accordingly, rotation of the engine 12 is transmitted from the first ring gear R1 to the second carrier CA2 at a constant speed. A high state of the HV travel mode is realized in a state in which the brake B1 is engaged and the clutch C1 is disengaged. In the high state of the HV travel mode, since the brake B1 is engaged, rotation of the first sun gear S1 is stopped and the gear shifting unit 58 falls into an overdrive state. Accordingly, rotation of the engine 12 increases and is transmitted from the first ring gear R1 to the second carrier CA2. In the HV travel mode, the hybrid control unit 102 causes the first rotary machine MG1 to output the MG1 torque Tg which is a reaction torque of the engine torque Te by power generation and causes the second rotary machine MG2 to output the MG2 torque Tm by the generated electric power Wg of the first rotary machine MG1 (see a solid line Lef in FIG. 3). In the HV travel mode, for example, in the low state of the HV travel mode, the second rotary machine MG2 can also be rotated oppositely to the rotating direction at the time of forward travel to allow reverse travel (see a solid line Ler in FIG. 3). In the HV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up.

Here, the hybrid control unit 102 controls the engine 12 and the first rotary machine MG1 such that the engine rotation speed Ne does not exceed an upper-limit engine rotation speed Nelim and the MG1 rotation speed Ng does not exceed an upper-limit MG1 rotation speed Nglim. The upper-limit engine rotation speed Nelim is, for example, a predetermined upper-limit rotation speed for making it difficult to decrease the performance of the engine 12, which is defined as a predetermined rating of the engine 12. The upper-limit MG1 rotation speed Nglim is, for example, a predetermined upper-limit rotation speed for making it difficult to decrease the performance of the first rotary machine MG1, which is defined as a predetermined rating of the first rotary machine MG1. Since the engine rotation speed Ne or the MG1 rotation speed Ng is associated with each other as can be clearly understood from the collinear diagram illustrated in FIG. 3, the MG1 rotation speed Ng can be made not to exceed the upper-limit MG1 rotation speed Nglim in addition to the engine rotation speed Ne, for example, by defining a feasible area of the engine rotation speed Ne.

FIG. 7 is a diagram illustrating an example of a feasible area of the engine rotation speed Ne on a two-dimensional coordinate system with the vehicle speed V and the engine rotation speed Ne as variables. In FIG. 7, when the engine rotation speed Ne increases in a low area of the vehicle speed, that is, the output rotation speed No, the MG1 rotation speed Ng exceeds the upper-limit MG1 rotation speed Nglim before the engine rotation speed Ne exceeds the upper-limit engine rotation speed Nelim, and thus a feasible area of the engine rotation speed Ne is defined according to the upper-limit MG1 rotation speed Nglim. As the vehicle speed V increases, the feasible area of the engine rotation speed Ne which is defined according to the upper-limit MG1 rotation speed Nglim is enlarged to a high-rotation side of the engine rotation speed Ne. However, since a predetermined upper-limit rotation speed is defined in the engine 12, the feasible area of the engine rotation speed Ne is defined according to the upper-limit engine rotation speed Nelim in a middle vehicle-speed area. On the other hand, when the output rotation speed No increases in the low area of the engine rotation speed Ne, a relative rotation speed Np2 of the second pinion P2 which is the absolute value of a rotation speed difference between an autorotation speed of the second pinion P2 and the rotation speed of the second carrier CA2 corresponding to the engine rotation speed Ne, that is, a revolution speed of the second pinion P2, increases and thus the feasible area of the engine rotation speed Ne is defined according to an upper-limit rotation speed of the relative rotation speed of the second pinion P2. The upper-limit rotation speed of the relative rotation speed of the second pinion P2 is, for example, a predetermined upper-limit rotation speed for making it difficult to decrease the performance of the second pinion P2. As the engine rotation speed Ne increases, the feasible area of the engine rotation speed Ne which is defined according to the upper-limit rotation speed of the relative rotation speed of the second pinion P2 is enlarged to a high vehicle-speed side. However, since a predetermined upper-limit rotation speed is defined in the second rotary machine MG2, the feasible area of the engine rotation speed Ne is defined according to an upper-limit MG2 rotation speed Nmlim in a high vehicle-speed area. The upper-limit MG2 rotation speed Nmlim is, for example, a predetermined upper-limit rotation speed for making it difficult to decrease the performance of the second rotary machine MG2, which is defined as a predetermined rating of the second rotary machine MG2.

When the engine rotation speed Ne does not exceed the upper-limit rotation speed in the feasible area of the engine rotation speed Ne as illustrated in FIG. 7, the engine rotation speed Ne cannot exceed the upper-limit engine rotation speed Nelim and the MG1 rotation speed Ng cannot exceed the upper-limit MG1 rotation speed Nglim. In this embodiment, in order for the engine rotation speed Ne not to exceed the upper-limit engine rotation speed Nelim and in order for the MG1 rotation speed Ng not to exceed the upper-limit MG1 rotation speed Nglim, the hybrid control unit 102 more appropriately performs control such that the engine rotation speed Ne is within a range which is not greater than a maximum rotation speed Nemax of the engine rotation speed Ne set lower by a margin α than the upper-limit rotation speed in the feasible area of the engine rotation speed Ne. The margin α is, for example, a margin of the engine rotation speed Ne which is determined in advance such that the engine rotation speed Ne and the MG1 rotation speed Ng do not exceed the predetermined upper-limit rotation speeds thereof. Since the engine 12 is controlled within a range which is not greater than the maximum rotation speed Nemax, the first rotary machine MG1 is controlled within a range which is not greater than a maximum rotation speed Ngmax of the MG1 rotation speed Ng which is set to be lower by a margin β than the upper-limit MG1 rotation speed Nglim. The margin β is, for example, a margin of the MG1 rotation speed Ng which is determined in advance such that the MG1 rotation speed Ng does not exceed the upper-limit MG1 rotation speed Nglim.

The above-mentioned target engine operating point OPengtgt is set as an engine operating point OPeng for realizing the required engine power Pedem, and is set in consideration that the engine rotation speed Ne is within a range which is not greater than the maximum rotation speed Nemax. The hybrid control unit 102 serves as a high rotation curbing means, that is, a high rotation curbing unit 102d, that controls the engine 12 and the first rotary machine MG1 such that the engine operating point OPeng reaches the target engine operating point OPengtgt which is set such that the engine rotation speed Ne is within a range not greater than the maximum rotation speed Nemax with a margin (=margin α) of the engine rotation speed Ne from the predetermined upper-limit rotation speeds of the engine 12 and the first rotary machine MG1 and which is set such that the required engine power Pedem is output from the engine 12. Control of the engine 12 is, for example, control of the engine torque Te for outputting the target engine torque Tetgt. Control of the first rotary machine MG1 is, for example, control of the MG1 torque Tg by feedback control for operating the first rotary machine MG1 such that the engine rotation speed Ne reaches the target engine rotation speed Netgt.

The engine rotation speed Ne may increase to exceed the maximum rotation speed Nemax depending on the vehicle condition. In this case, decreasing the engine torque Te can be considered. Since the engine 12 includes the supercharger 18, a response delay of the engine torque Te occurs due to a response delay of the supercharging pressure Pchg, and there is concern of the engine rotation speed Ne falling into a high-rotation state as the engine rotation speed Ne or the MG1 rotation speed Ng approaches the predetermined upper-limit rotation speed thereof even when the engine 12 is controlled such that the engine torque Te is decreased. Setting the maximum rotation speed Nemax to a low value in order to make it difficult for the engine rotation speed Ne to fall into such a high-rotation state can be considered, but there is concern of the decrease in the engine torque Te advancing and causing a decrease in power performance in this case.

Specifically, in order to realize a control function of curbing a decrease in power performance due to a decrease in the engine torque Te which is based on the condition that the engine rotation speed Ne exceeds the maximum rotation speed Nemax and preventing the engine rotation speed Ne from falling into a high-rotation state, the electronic control unit 100 further includes a condition determining means, that is, a condition determining unit 104, and a rotation speed setting means, that is, a rotation speed setting unit 106.

The condition determining unit 104 determines whether the engine rotation speed Ne exceeds the maximum rotation speed Nemax.

When the condition determining unit 104 determines that the engine rotation speed Ne exceeds the maximum rotation speed Nemax, the high rotation curbing unit 102d controls the engine 12 such that the engine torque Te is decreased. The high rotation curbing unit 102d decreases the engine torque Te, for example, by performing at least one torque-down control of decreasing an opening of the electronic throttle valve 38 and delaying an ignition time. Alternatively, the high rotation curbing unit 102d decreases the engine torque Te, for example, by performing fuel-cut control for stopping supply of fuel to the engine 12.

When the engine torque Te is decreased with the engine rotation speed Ne exceeding the maximum rotation speed Nemax, a response delay of the engine torque Te due to a response delay of the supercharging pressure Pchg is more likely to occur when the supercharging pressure Pchg from the supercharger 18 is high than when the supercharging pressure Pchg is low. Accordingly, when the supercharging pressure Pchg is high, the engine rotation speed Ne is more likely to fall into a high-rotation state as the engine rotation speed Ne or the MG1 rotation speed Ng approaches the predetermined upper-limit rotation speed thereof due to the response delay of the supercharging pressure Pchg than when the supercharging pressure is low.

The rotation speed setting unit 106 sets the maximum rotation speed Nemax to a lower value when the supercharging pressure Pchg from the supercharger 18 is high than when the supercharging pressure Pchg is low.

Since an air density is greater when the intake air temperature THair is low than when the intake air temperature THair is high, the engine torque Te increases and the engine rotation speed Ne is likely to fall into a high-rotation state.

When the intake air temperature THair is low, the rotation speed setting unit 106 sets the maximum rotation speed Nemax to a lower value than when the intake air temperature THair is high.

Figure 8:
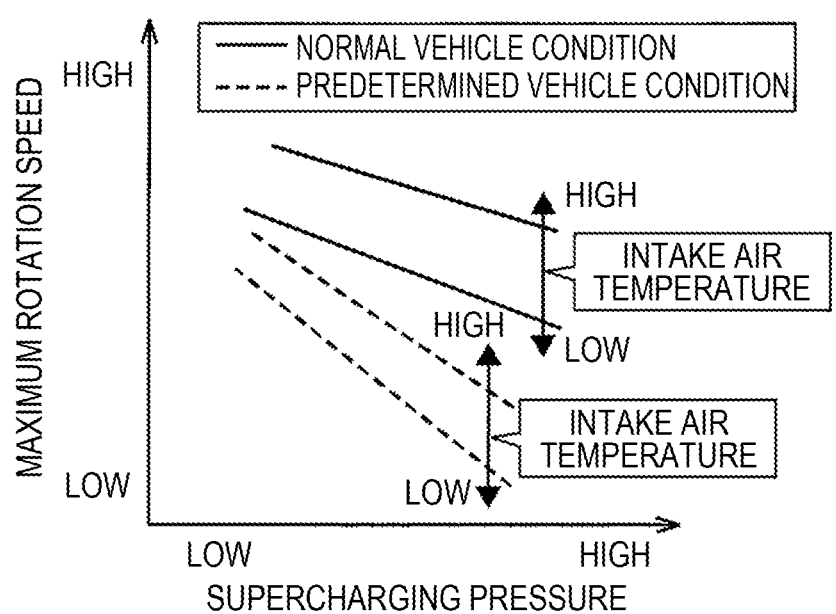
FIG. 8 is a diagram illustrating an example of a maximum rotation speed which is set based on a supercharging pressure.

FIG. 8 is a diagram illustrating an example of the maximum rotation speed Nemax which is set based on the supercharging pressure Pchg from the supercharger 18. In FIG. 8, a solid line represents an example of a map which is used to set the maximum rotation speed Nemax when the vehicle condition is a normal vehicle condition, that is, a normal vehicle condition map. The normal vehicle condition is, for example, a vehicle condition in which the engine rotation speed Ne or the MG1 rotation speed Ng is less likely to reach the predetermined upper-limit rotation speed thereof. A dotted line represents an example of a map which is used to set the maximum rotation speed Nemax when the vehicle condition is a predetermined vehicle condition, that is, a predetermined vehicle condition map. The predetermined vehicle condition is, for example, a vehicle condition in which the engine rotation speed Ne or the MG1 rotation speed Ng is likely to reach the predetermined upper-limit rotation speed thereof, that is, a vehicle condition in which the engine rotation speed Ne is more likely to fall into a high-rotation state as the engine rotation speed Ne or the MG1 rotation speed Ng approaches the predetermined upper-limit rotation speed thereof. In any of the normal vehicle condition map and the predetermined vehicle condition map, the maximum rotation speed Nemax is set in advance to a lower value as the supercharging pressure Pchg becomes higher. In any of the normal vehicle condition map and the predetermined vehicle condition map, the maximum rotation speed Nemax is set in advance to a lower value as the intake air temperature THair becomes lower. The engine rotation speed Ne is more likely to fall into a high-rotation state when the vehicle condition is the predetermined vehicle condition than when the vehicle condition is the normal vehicle condition. Accordingly, in the predetermined vehicle condition map, the maximum rotation speed Nemax is set in advance to a lower value than in the normal vehicle condition map. That is, when the vehicle condition is the predetermined vehicle condition, the maximum rotation speed Nemax is set in advance to a lower value than when the vehicle condition is the normal vehicle condition.

Referring to FIG. 8, the rotation speed setting unit 106 sets the maximum rotation speed Nemax to a lower value as the supercharging pressure Pchg becomes higher. The rotation speed setting unit 106 sets the maximum rotation speed Nemax to a lower value as the intake air temperature THair becomes lower. The rotation speed setting unit 106 sets the maximum rotation speed Nemax to a lower value when the vehicle condition is the predetermined vehicle condition than when the vehicle condition is the normal vehicle condition.

The condition determining unit 104 determines whether the vehicle condition is the predetermined vehicle condition.

When the vehicle is traveling on a road on which the driving wheels 16 are likely to slip, that is, a slippery road, the output rotation speed No is likely to increase due to idling of the driving wheels 16 and the engine rotation speed Ne is also likely to increase. Alternatively, when the vehicle is traveling on a road on which the driving wheels 16 are likely to slip, the output rotation speed No is likely to decrease due to lock of the driving wheels 16 and the MG1 rotation speed Ng is also likely to increase. The slippery road is a road on which the driving wheels 16 are likely to idle or to be locked and examples thereof include a low-μ road, a rough road, and an unpaved road.

The condition determining unit 104 determines whether the vehicle condition is the predetermined vehicle condition based on whether the vehicle 10 is traveling on a road on which the driving wheels 16 are likely to slip. The condition determining unit 104 determines whether the vehicle 10 is traveling on a road on which the driving wheels 16 are likely to slip, for example, based on whether a difference between an average wheel speed Nwd of the wheel speeds Nwdl and Nwdr of the driving wheels 16 and an average wheel speed Nws of the wheel speeds Nwsl and Nwsr of the driven wheels is greater than a predetermined slip determination threshold value for determining whether a tire slip has occurred. Alternatively, it may be determined whether the vehicle 10 is traveling on a road which the driving wheels 16 are likely to slip using a wheel slip rate (=(Nwd−Nws)/Nwd), rates of change of the wheel speeds Nwdl, Nwdr, Nwsl, and Nwsr, an outside air temperature, a road surface temperature, vehicle acceleration, and the like.

In another point of view, when the first rotary machine MG1 is subjected to a predetermined output limitation, control of the first rotary machine MG1 for causing the engine rotation speed Ne to reach the target engine rotation speed Netgt may not be appropriately performed and the engine rotation speed Ne is likely to increase. The predetermined output limitation is, for example, an output limitation with which power generation or powering of the first rotary machine MG1 when the MG1 torque Tg which is a reaction torque of the engine torque Te is output cannot be appropriately performed. Examples of the output limitation with which power generation or powering of the first rotary machine MG1 cannot be appropriately performed include a state in which the temperature of the first rotary machine MG1 is high or low such that the MG1 temperature THg is outside of a predetermined normal temperature area THgra and a state in which the temperature of the battery 54 is high or low such that the battery temperature THbat is outside of a predetermined normal temperature area THbatra. The predetermined normal temperature area THgra is a normal use area of the first rotary machine MG1 and is a predetermined temperature area of the first rotary machine MG1 in which the output of the first rotary machine MG1 does not decrease according to the MG1 temperature THg. The predetermined normal temperature area THbatra is a normal use area of the battery 54 and is a predetermined temperature area of the battery 54 in which the chargeable and dischargeable electric powers Win and Wout do not decrease according to the battery temperature THbat.

The condition determining unit 104 determines whether the vehicle condition is the predetermined vehicle condition based on whether the first rotary machine MG1 is subjected to the predetermined output limitation. When the MG1 temperature THg or the battery temperature THbat is outside of the predetermined normal temperature area thereof, the condition determining unit 104 determines that the first rotary machine MG1 is subjected to the predetermined output limitation.

In another point of view, when the braking operation of the wheel brake device 87 is limited, for example, when an operation of an ABS is limited, the driving wheels 16 are less likely to be locked at the time of braking, the output rotation speed No is likely to decrease, and the MG1 rotation speed Ng is likely to increase. When the braking operation of the wheel brake device 87 is limited, for example, when an operation of TRC or VSC is limited, the driving wheels 16 are likely to idle, the output rotation speed No is likely to increase, and the engine rotation speed Ne is likely to increase. Limitation of the braking operation of the wheel brake device 87 is limitation of brake performance of the wheel brake device 87, for example, limitation due to inappropriate operation of the ABS, TRC, or VSC or limitation due to non-operation thereof. Examples thereof include a case in which an abnormality occurs in a sensor associated with the braking operation of the wheel brake device 87 of the wheel speed sensors 91 or the like and a case in which non-operation is selected by a switch for switching between operation and non-operation of TRC or VSC.

The condition determining unit 104 determines whether the vehicle condition is the predetermined vehicle condition based on whether the braking operation of the wheel brake device 87 is limited. When an abnormality occurs in a sensor associated with the braking operation of the wheel brake device 87 or when non-operation of TRC, VSC, or the like is selected, the condition determining unit 104 determines that the braking operation of the wheel brake device 87 is limited.

When the condition determining unit 104 determines that the vehicle condition is the predetermined vehicle condition, the rotation speed setting unit 106 sets the maximum rotation speed Nemax, for example, using the predetermined vehicle condition map illustrated in FIG. 8. When the condition determining unit 104 determines that the vehicle condition is not the predetermined vehicle condition, the rotation speed setting unit 106 sets the maximum rotation speed Nemax, for example, using the normal vehicle condition map illustrated in FIG. 8. In this way, when the condition determining unit 104 determines that the vehicle condition is the predetermined vehicle condition, the rotation speed setting unit 106 sets the maximum rotation speed Nemax to a lower value than when the condition determining unit 104 determines that the vehicle condition is not the predetermined vehicle condition.

FIG. 9 is a flowchart illustrating a principal part of a control operation of the electronic control unit 100 and illustrating a control operation for curbing a decrease in power performance due to a decrease in the engine torque Te and preventing the engine rotation speed Ne from falling into a high-rotation state, which is repeatedly performed.

In FIG. 9, first, in Step (the word "step" is omitted below) S10 corresponding to the function of the condition determining unit 104, it is determined whether the vehicle condition is the predetermined vehicle condition based on whether the vehicle 10 is traveling on a road on which the driving wheels 16 are likely to slip, whether the first rotary machine MG1 is subjected to the predetermined output limitation, or whether the braking operation of the wheel brake device 87 is limited. When the determination result of S10 is positive, the supercharging pressure Pchg, the intake air temperature THair, and the like are acquired in S20 corresponding to the function of the rotation speed setting unit 106. Subsequently, in S30 corresponding to the function of the rotation speed setting unit 106, the maximum rotation speed Nemax is set, for example, using the predetermined vehicle condition map illustrated in FIG. 8. On the other hand, when the determination result of S10 is negative, the supercharging pressure Pchg, the intake air temperature THair, and the like are acquired in S40 corresponding to the function of the rotation speed setting unit 106. Subsequently, in S50 corresponding to the function of the rotation speed setting unit 106, the maximum rotation speed Nemax is set, for example, using the normal vehicle condition map illustrated in FIG. 8. In S60 corresponding to the function of the condition determining unit 104 subsequent to S30 or subsequent to S50, it is determined whether the engine rotation speed Ne exceeds the maximum rotation speed Nemax. When the determination result of S60 is positive, the engine torque Te is decreased by fuel-cut control or torque-down control in S70 corresponding to the function of the high rotation curbing unit 102d. When the determination result of S60 is negative, the normal control for controlling the engine 12 and the first rotary machine MG1 is performed such that the engine operating point OPeng reaches the target engine operating point OPengtgt which is set such that the engine rotation speed Ne is within a range which does not exceed the maximum rotation speed Nemax and the required engine power Pedem is output from the engine 12 in S80 corresponding to the function of the high rotation curbing unit 102d.

As described above, according to this embodiment, since the maximum rotation speed Nemax is set to a lower value when the supercharging pressure Pchg from the supercharger 18 is high than when the supercharging pressure Pchg is low, the engine torque Te is decreased at a relatively low engine rotation speed Ne and the engine rotation speed Ne is less likely to fall into a high-rotation state. When the supercharging pressure Pchg is relatively low and the engine rotation speed Ne is less likely to fall into a high-rotation state, the maximum rotation speed Nemax is set to a relatively high value. Accordingly, the engine torque Te is not decreased at a relatively high engine rotation speed Ne and it becomes easier to secure power performance. Accordingly, it is possible to curb a decrease in power performance due to a decrease in the engine torque Te and to prevent the engine rotation speed Ne from falling into a high-rotation state.

According to this embodiment, since the maximum rotation speed Nemax is set to a lower value as the supercharging pressure Pchg becomes higher, the engine rotation speed Ne is appropriately less likely to fall into a high-rotation state when the supercharging pressure Pchg is relatively high and it becomes easier to appropriately secure power performance when the supercharging pressure Pchg is relatively low.

According to this embodiment, since the maximum rotation speed Nemax is set to a lower value when the intake air temperature THair is low than when the intake air temperature THair is high, the engine torque Te is decreased at a relatively low engine rotation speed Ne and the engine rotation speed Ne is less likely to fall into a high-rotation state.

According to this embodiment, since the maximum rotation speed Nemax is set to a lower value as the intake air temperature THair becomes lower, the engine rotation speed Ne is appropriately less likely to fall into a high-rotation state.

According to this embodiment, since the maximum rotation speed Nemax is set to a lower value when it is determined that the vehicle condition is the predetermined vehicle condition than when it is determined that the vehicle condition is not the predetermined vehicle condition, the engine torque Te is decreased at a relatively low engine rotation speed Ne and the engine rotation speed Ne is less likely to fall into a high-rotation state.

According to this embodiment, when the vehicle 10 is traveling on a road on which the driving wheels 16 are likely to slip, it is determined that the vehicle condition is the predetermined vehicle condition and thus the engine rotation speed Ne is less likely to fall into a high-rotation state.

According to this embodiment, when the first rotary machine MG1 is subjected to the predetermined output limitation, it is determined that the vehicle condition is the predetermined vehicle condition and thus the engine rotation speed Ne is less likely to fall into a high-rotation state.

According to this embodiment, when the MG1 temperature THg or the battery temperature THbat is outside of the predetermined normal temperature area thereof, it is determined that the first rotary machine MG1 is subjected to the predetermined output limitation and thus the engine rotation speed Ne is less likely to fall into a high-rotation state.

According to this embodiment, when the braking operation of the wheel brake device 87 is limited, it is determined that the vehicle condition is the predetermined vehicle condition and thus the engine rotation speed Ne is less likely to fall into a high-rotation state.

Another embodiment of the present disclosure will be described below. In the following description, elements common to those in the above-mentioned embodiment will be referred to by the same reference signs and description thereof will not be repeated.

In this embodiment, a vehicle 200 which is different from the vehicle 10 described above in the first embodiment and which is illustrated in FIG. 10 is exemplified. FIG. 10 is a diagram schematically illustrating a configuration of a vehicle 200 to which the present disclosure is applied. In FIG. 10, the vehicle 200 is a hybrid vehicle including an engine 202, a first rotary machine MG1, a second rotary machine MG2, a power transmission device 204, driving wheels 206.

The engine 202, the first rotary machine MG1, and the second rotary machine MG2 have the same configurations as the engine 12, the first rotary machine MG1, and the second rotary machine MG2 described above in the first embodiment. An engine torque Te of the engine 202 is controlled by causing an electronic control unit 242 which will be described later to control an engine control device 208 including an electronic throttle valve, a fuel injection device, an ignition device, and a waste gate valve which are provided in the vehicle 200. The first rotary machine MG1 and the second rotary machine MG2 are connected to a battery 212 that is a power storage device provided in the vehicle 200 via an inverter 210 provided in the vehicle 200. An MG1 torque Tg and an MG2 torque Tm of the first rotary machine MG1 and the second rotary machine MG2 are controlled by causing the electronic control unit 242 to control the inverter 210.

A power transmission device 204 includes an electrical stepless gear shifting unit 216 and a mechanical stepped gear shifting unit 218 which are arranged in series on a common axis in a case 214 that is a non-rotary member attached to the vehicle body. The electrical stepless gear shifting unit 216 is connected to the engine 202 directly or indirectly via a damper which is not illustrated or the like. The mechanical stepped gear shifting unit 218 is connected to an output side of the electrical stepless gear shifting unit 216. The power transmission device 204 includes a differential gear unit 222 that is connected to an output shaft 220 which is an output rotary member of the mechanical stepped gear shifting unit 218 and a pair of axles 224 that is connected to the differential gear unit 222 or the like. In the power transmission device 204, power which is output from the engine 202 or the second rotary machine MG2 is transmitted to the mechanical stepped gear shifting unit 218 and is transmitted from the mechanical stepped gear shifting unit 218 to the driving wheels 206 via the differential gear unit 222 or the like. The power transmission device 204 having this configuration is suitably used for a vehicle of a front-engine rear-drive (FR) type. In the following description, the electrical stepless gear shifting unit 216 is referred to as a stepless gear shifting unit 216 and the mechanical stepped gear shifting unit 218 is referred to as a stepped gear shifting unit 218. The stepless gear shifting unit 216, the stepped gear shifting unit 218, or the like is disposed to be substantially symmetric with respect to the common axis, and a lower half with respect to the axis is not illustrated in FIG. 10. The common axis is an axis of a crankshaft of the engine 202, a connection shaft 226 connected to the crankshaft, or the like.

The stepless gear shifting unit 216 includes a differential mechanism 230 that is a power split mechanism that mechanically splits power of the engine 202 to the first rotary machine MG1 and an intermediate transmission member 228 which is an output rotary member of the stepless gear shifting unit 216. The first rotary machine MG1 is a rotary machine to which power of the engine 202 is transmitted. The second rotary machine MG2 is connected to the intermediate transmission member 228 in a power-transmittable manner. Since the intermediate transmission member 228 is connected to the driving wheels 206 via the stepped gear shifting unit 218, the second rotary machine MG2 is a rotary machine that is connected to the driving wheels 206 in a power-transmittable manner. The differential mechanism 230 is a differential mechanism that splits and transmits power of the engine 202 to the driving wheels 206 and the first rotary machine MG1. The stepless gear shifting unit 216 is an electrical stepless transmission in which a differential state of the differential mechanism 230 is controlled by controlling the operating state of the first rotary machine MG1. The first rotary machine MG1 is a rotary machine that can control an engine rotation speed Ne, that is, adjust the engine rotation speed Ne.

The differential mechanism 230 is constituted by a single-pinion type planetary gear unit and includes a sun gear S0, a carrier CA0, and a ring gear R0. The engine 202 is connected to the carrier CA0 via the connection shaft 226 in a power-transmittable manner, the first rotary machine MG1 is connected to the sun gear S0 in a power-transmittable manner, and the second rotary machine MG2 is connected to the ring gear R0 in a power-transmittable manner. In the differential mechanism 230, the carrier CA0 serves as an input element, the sun gear S0 serves as a reaction element, and the ring gear R0 serves as an output element.

The stepped gear shifting unit 218 is a stepped transmission constituting a part of a power transmission path between the intermediate transmission member 228 and the driving wheels 206, that is, a mechanical gear shifting mechanism constituting a part of a power transmission path between the stepless gear shifting unit 216 (which is synonymous with the differential mechanism 230) and the driving wheels 206. The intermediate transmission member 228 also serves as an input rotary member of the stepped gear shifting unit 218. The stepped gear shifting unit 218 is, for example, a known planetary gear type automatic transmission including a plurality of planetary gear units such as a first planetary gear unit 232 and a second planetary gear unit 234 and a plurality of engagement devices such as a one-way clutch F1, a clutch C1, a clutch C2, a brake B1, and a brake B2. In the following description, the clutch C1, the clutch C2, the brake B1, and the brake B2 are simply referred to as engagement devices CB when not particularly distinguished.

Each engagement device CB is a hydraulic frictional engagement device which is constituted by a multi-disc or single-disc clutch or brake which is pressed by a hydraulic actuator, a band brake which is tightened by a hydraulic actuator, and the like. The operating state such as an engaged state or a disengaged state of each engagement device CB is switched by changing an engagement torque Tcb which is a torque capacity thereof using controlled engagement oil pressures PRcb of the engagement devices CB which are output from solenoid valves SL1 to SL4 or the like in a hydraulic pressure control circuit 236 provided in the vehicle 200.

In the stepped gear shifting unit 218, rotary elements of the first planetary gear unit 232 and the second planetary gear unit 234 are partially connected to each other directly or indirectly via the engagement devices CB or the one-way clutch F1 or are connected to the intermediate transmission member 228, the case 214, or the output shaft 220. The rotary elements of the first planetary gear unit 232 are a sun gear S1, a carrier CA1, and a ring gear R1, and the rotary elements of the second planetary gear unit 234 are a sun gear S2, a carrier CA2, and a ring gear R2.

In the stepped gear shifting unit 218, one gear stage of a plurality of gear stages with different gear ratios γat (=AT input rotation speed Ni/AT output rotation speed No) is formed by engaging one of a plurality of engagement devices. In this embodiment, a gear stage which is formed in the stepped gear shifting unit 218 is referred to as an AT gear stage. The AT input rotation speed Ni is an input rotation speed of the stepped gear shifting unit 218 and has the same value as a rotation speed of the intermediate transmission member 228 and the same value as an MG2 rotation speed Nm. The AT output rotation speed No is a rotation speed of the output shaft 220 which is an output rotation speed of the stepped gear shifting unit 218 and is also an output rotation speed of a composite transmission 238 which is a combined transmission including the stepless gear shifting unit 216 and the stepped gear shifting unit 218.

In the stepped gear shifting unit 218, for example, as illustrated in an engagement operation table of FIG. 11, four forward AT gear stages including a first AT gear stage ("1st" in the drawing) to a fourth AT gear stage ("4th" in the drawing) are formed as a plurality of AT gear stages. The gear ratio γat of the first AT gear stage is the highest and the gear ratio γat becomes lower in a higher AT gear stage. A reverse AT gear stage ("Rev" in the drawing) is formed, for example, by engagement of the clutch C1 and engagement of the brake B2. That is, for example, the first AT gear stage is formed at the time of reverse travel. The engagement operation table illustrated in FIG. 11 is obtained by collecting relationships between the AT gear stages and the operation states of the plurality of engagement devices. In FIG. 11, "O" denotes engagement, "Δ" denotes engagement at the time of engine braking or at the time of coast downshift of the stepped gear shifting unit 218, and a blank denotes disengagement.

In the stepped gear shifting unit 218, an AT gear stage which is formed according to a driver's operation of an accelerator, a vehicle speed V, or the like is switched, that is, a plurality of AT gear stages are selectively formed, by an electronic control unit 242 which will be described later. For example, in gear shifting control of the stepped gear shifting unit 218, so-called clutch-to-clutch gear shifting in which gear shifting is performed by switching one of the engagement devices CB, that is, gear shifting is performed by switching of the engagement device CB between engagement and disengagement, is performed.

The vehicle 200 further includes an one-way clutch F0. The one-way clutch F0 is a lock mechanism that can fix the carrier CA0 in a non-rotatable manner. That is, the one-way clutch F0 is a lock mechanism that can fix the connection shaft 226 which is connected to the crankshaft of the engine 202 and which rotates integrally with the carrier CA0 to the case 214. In the one-way clutch F0, one member of two members rotatable relative to each other is integrally connected to the connection shaft 226 and the other member is integrally connected to the case 214. The one-way clutch F0 idles in a positive rotating direction which is a rotating direction at the time of operation of the engine 202 and is automatically engaged in a negative rotating direction which is opposite to that at the time of operation of the engine 202. Accordingly, at the time of idling of the one-way clutch F0, the engine 202 is rotatable relative to the case 214. On the other hand, at the time of engagement of the one-way clutch F0, the engine 202 is not rotatable relative to the case 214. That is, the engine 202 is fixed to the case 214 by engagement of the one-way clutch F0. In this way, the one-way clutch F0 permits rotation in the positive rotating direction of the carrier CA0 which is a rotating direction at the time of operation of the engine 202 and prohibits rotation in the negative rotating direction of the carrier CA0. That is, the one-way clutch F0 is a lock mechanism that can permit rotation in the positive rotating direction of the engine 202 and prohibit rotation in the negative rotating direction.

The vehicle 200 further includes a wheel brake device 240 which is a brake device that applies a wheel brake torque to vehicle wheels (the driving wheels 206 and driven wheels which are not illustrated). The wheel brake device 240 has the same configuration as the wheel brake device 87 described above in the first embodiment.

The vehicle 200 further includes an electronic control unit 242 which is a controller including a control device for the vehicle 200 associated with control of the engine 202, the first rotary machine MG1, the second rotary machine MG2, and the like. The electronic control unit 242 has the same configuration as the electronic control unit 100 described above in the first embodiment. The electronic control unit 242 is supplied with various signals which are the same as supplied to the electronic control unit 100. Various command signals which are the same as output from the electronic control unit 100 are output from the electronic control unit 242. The electronic control unit 242 has functions equivalent to the functions of the hybrid control unit 102, the condition determining unit 104, and the rotation speed setting unit 106 which are included in the electronic control unit 100. The electronic control unit 242 can realize a control function capable of curbing a decrease in power performance due to a decrease in the engine torque Te and preventing the engine rotation speed Ne from falling into a high-rotation state, which is the same function as realized by the electronic control unit 100 described above in the first embodiment.

In the vehicle 200, the stepped gear shifting unit 218 is provided in series on the rear stage of the stepless gear shifting unit 216. Accordingly, when the AT gear stage of the stepped gear shifting unit 218 is switched at a certain vehicle speed V, the rotation speed of the ring gear R0 which is the output rotation speed of the stepless gear shifting unit 216 changes. Then, a feasible area of the engine rotation speed Ne changes based on a difference between the AT gear stages in the stepped gear shifting unit 218.

Figure 12:
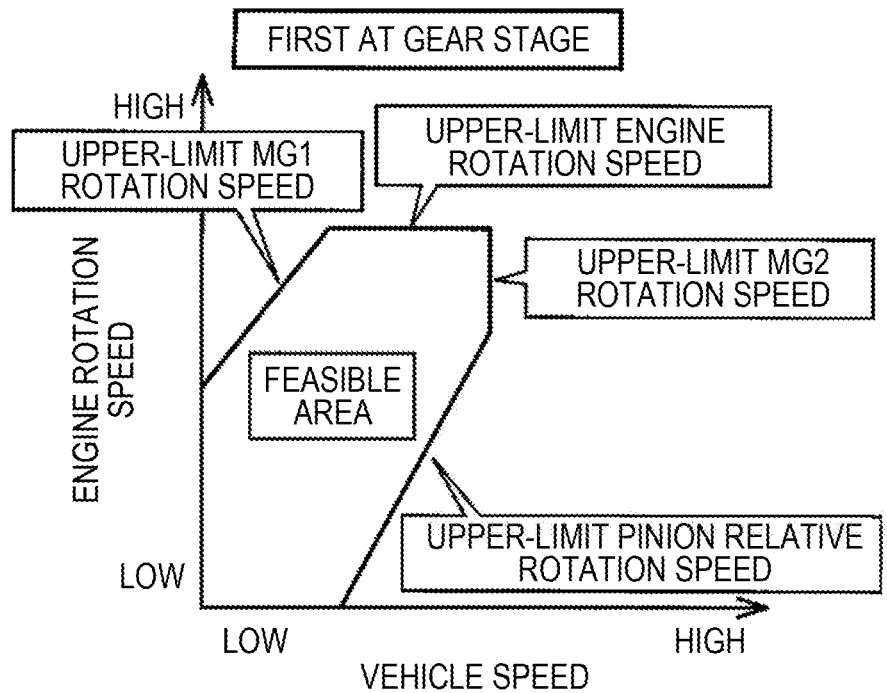
FIG. 12 is a diagram illustrating an example of a feasible area of an engine rotation speed in the vehicle illustrated in FIG. 10 at a first AT gear stage.
Figure 13:
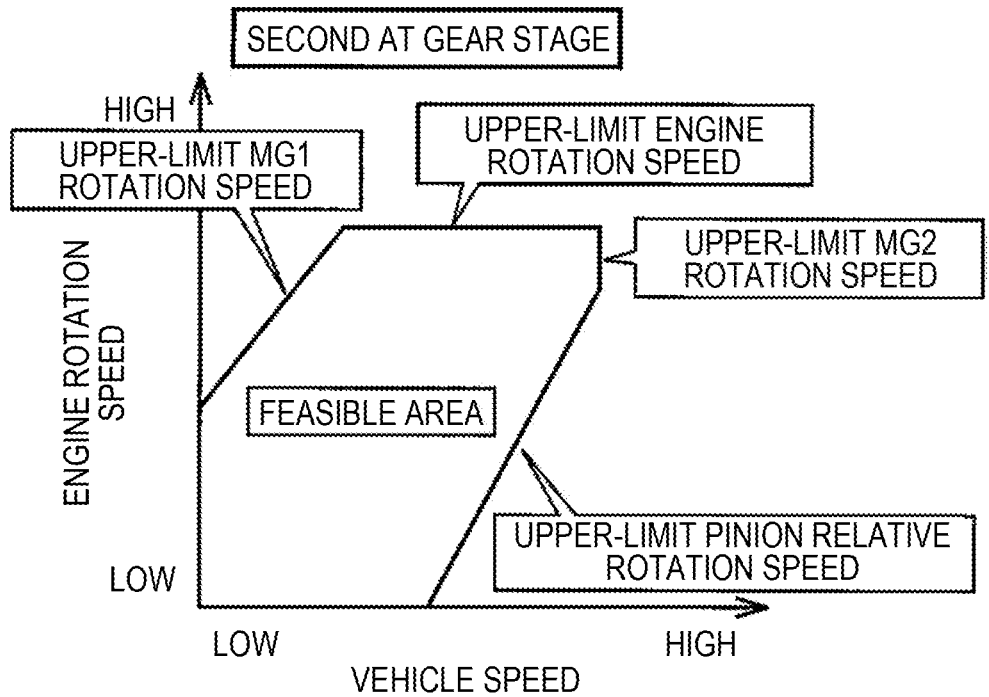
FIG. 13 is a diagram illustrating an example of a feasible area of an engine rotation speed in the vehicle illustrated in FIG. 10 at a second AT gear stage.
Figure 14:
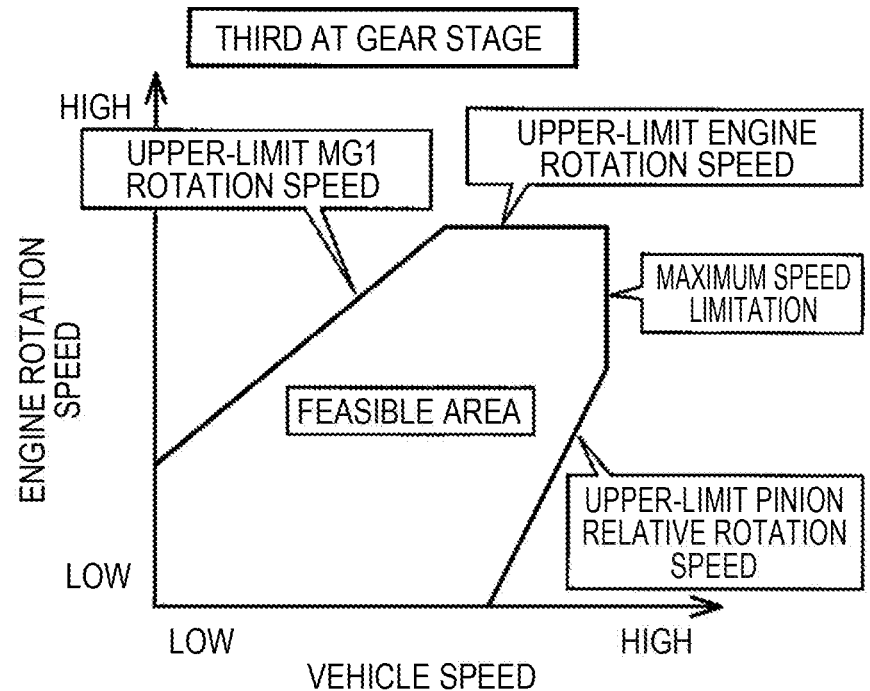
FIG. 14 is a diagram illustrating an example of a feasible area of an engine rotation speed in the vehicle illustrated in FIG. 10 at a third AT gear stage.
Figure 15:
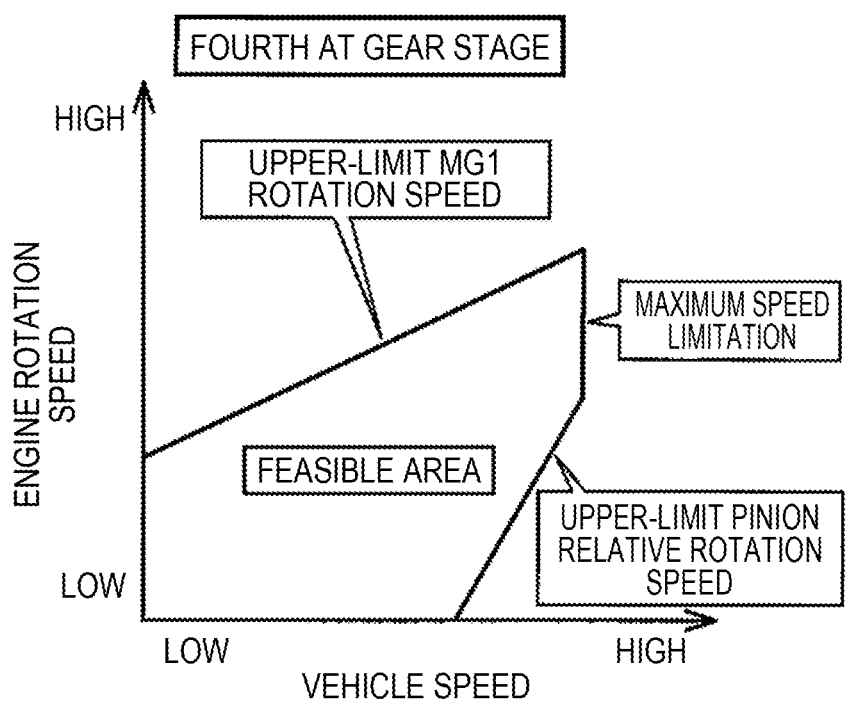
FIG. 15 is a diagram illustrating an example of a feasible area of an engine rotation speed in the vehicle illustrated in FIG. 10 at a fourth AT gear stage.

FIGS. 12, 13, 14, and 15 are diagrams illustrating an example of a feasible area of the engine rotation speed Ne on a two-dimensional coordinate system with the vehicle speed V and the engine rotation speed Ne as variables and illustrating an embodiment other than illustrated in FIG. 7 in the first embodiment. FIG. 12 illustrates a case in which the stepped gear shifting unit 218 is set to the first AT gear stage, FIG. 13 illustrates a case in which the stepped gear shifting unit 218 is set to the second AT gear stage, FIG. 14 illustrates a case in which the stepped gear shifting unit 218 is set to the third AT gear stage, and FIG. 15 illustrates a case in which the stepped gear shifting unit 218 is set to the fourth AT gear stage. In FIGS. 12, 13, 14, and 15, the basic idea for defining the feasible area of the engine rotation speed Ne is the same as described above with reference to FIG. 7. As the stepped gear shifting unit 218 is set to a higher AT gear stage at a certain vehicle speed V, the rotation speed of the ring gear R0 which is the output rotation speed of the stepless gear shifting unit 216 becomes lower. Accordingly, in a low area of the engine rotation speed Ne, the feasible area of the engine rotation speed Ne which is defined according to the upper limit of the relative rotation speed of the second pinion P2 is enlarged to a higher vehicle speed side at a higher AT gear stage. At the third AT gear stage or at the fourth AT gear stage, the rotation speed of the ring gear R0 decreases and thus the feasible area of the engine rotation speed Ne is not defined according to the upper-limit MG2 rotation speed Nmlim, but the feasible area of the engine rotation speed Ne is defined according to a maximum vehicle speed of the vehicle 200. When the AT gear stage of the stepped gear shifting unit 218 is on a high side and the rotation speed of the ring gear R0 decreases, the MG1 rotation speed Ng is likely to increase. Accordingly, in a low vehicle speed area, limitation on a high rotation side of the feasible area of the engine rotation speed Ne which is defined according to the upper-limit MG1 rotation speed Nglim increases as the AT gear stage becomes higher.

According to this embodiment described above, the same advantages as in the first embodiment are obtained.

Figure 16:
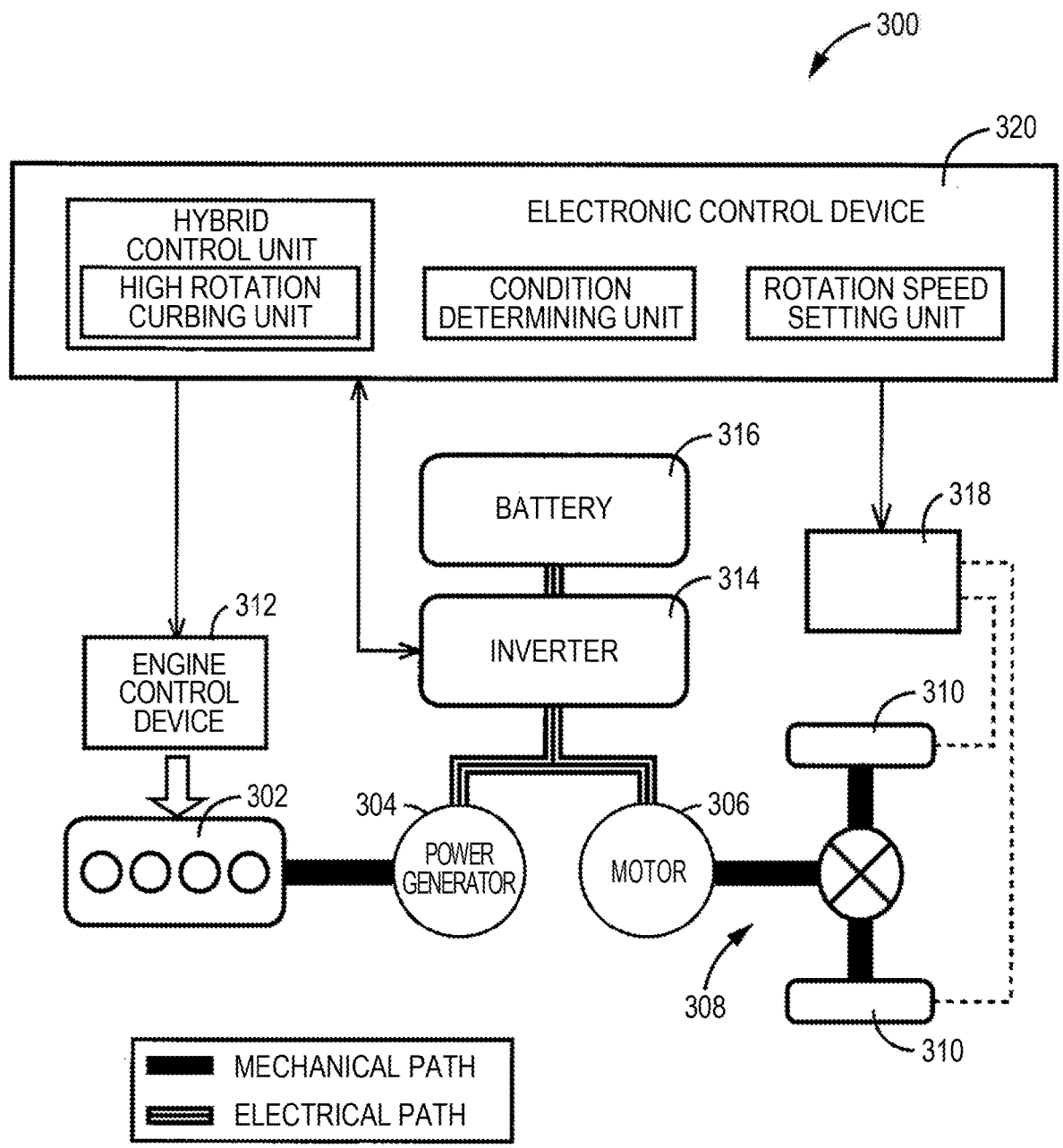
FIG. 16 is a diagram schematically illustrating a configuration of a vehicle to which the present disclosure is applied and which is different from the vehicle illustrated in FIGS. 1 and 10.

In this embodiment, a vehicle 300 which is different from the vehicle 10 described above in the first embodiment and which is illustrated in FIG. 16 is exemplified. FIG. 16 is a diagram schematically illustrating a configuration of a vehicle 300 to which the present disclosure is applied. In FIG. 16, the vehicle 300 is a series type hybrid vehicle including an engine 302, a power generator 304, a motor 306, a power transmission device 308, and driving wheels 310.

The engine 302 has the same configuration as the engine 12 described above in the first embodiment. An engine torque Te of the engine 302 is controlled by causing an electronic control unit 320 which will be described later to control an engine control device 312 such as an electronic throttle valve, a fuel injection device, an ignition device, and a waste gate valve which are provided in the vehicle 300. The engine 302 is not mechanically connected to the driving wheels 310.

The power generator 304 is a rotary electric machine that has only a function of a power generator. The power generator 304 is a rotary machine that is mechanically connected to the engine 302 and to which power of the engine 302 is transmitted. The power generator 304 is rotationally driven by the engine 302 to generate electric power with power of the engine 302. The power generator 304 is a rotary machine that can control the engine rotation speed Ne, that is, a rotary machine that can adjust the engine rotation speed Ne. The motor 306 is a rotary electric machine having a function of an electric motor and a function of a power generator and is called a motor generator. The motor 306 is a rotary machine that is connected to the driving wheels 310 via the power transmission device 308 in a power-transmittable manner. The power generator 304 and the motor 306 are connected to a battery 316 that is a power storage device provided in the vehicle 300 via an inverter 314 provided in the vehicle 300. In the power generator 304 and the motor 306, a power generator torque Tgr which is an output torque of the power generator 304 and a motor torque Tmt which is an output torque of the motor 306 are controlled by causing the electronic control unit 320 to control the inverter 314. Generated electric power Wgr of the power generator 304 is charged in the battery 316 or is consumed in the motor 306. The motor 306 outputs the motor torque Tmt using all or some of the generated electric power Wgr or using electric power from the battery 316 in addition to the generated electric power Wgr. In this way, the motor 306 is driven with the generated electric power Wgr of the power generator 304.

The vehicle 300 further includes a wheel brake device 318 which is a brake device that applies a wheel brake torque to vehicle wheels (the driving wheels 310 and driven wheels which are not illustrated). The wheel brake device 318 has the same configuration as the wheel brake device 87 described above in the first embodiment.

The vehicle 300 further includes an electronic control unit 320 which is a controller including a control device for the vehicle 300 associated with control of the engine 302, the power generator 304, the motor 306, and the like. The electronic control unit 320 has the same configuration as the electronic control unit 100 described above in the first embodiment. The electronic control unit 320 is supplied with various signals which are the same as supplied to the electronic control unit 100. Various command signals which are the same as output from the electronic control unit 100 are output from the electronic control unit 320. The electronic control unit 320 has functions equivalent to the functions of the hybrid control unit 102, the condition determining unit 104, and the rotation speed setting unit 106 which are included in the electronic control unit 100. The electronic control unit 320 can realize a control function capable of curbing a decrease in power performance due to a decrease in the engine torque Te and preventing the engine rotation speed Ne from falling into a high-rotation state, which is the same function as realized by the electronic control unit 100 described above in the first embodiment.

In the vehicle 300, since the engine 302 is not mechanically connected to the driving wheels 310, a phenomenon in which the engine rotation speed Ne or the rotation speed of the power generator 304 increases due to idling or lock of the driving wheels 310 does not occur. On the other hand, when the power generator 304 is subjected to the predetermined output limitation, control of the power generator 304 for causing the engine rotation speed Ne to reach the target engine rotation speed Netgt may not be appropriately performed and the engine rotation speed Ne is likely to increase. Accordingly, in the vehicle 300, whether the vehicle 10 is traveling on a road on which the driving wheels 310 are likely to slip or whether the braking operation of the wheel brake device 87 is limited is not considered, but whether the power generator 304 is subjected to the predetermined output limitation is considered in order to determine whether the vehicle condition is the predetermined vehicle condition.

According to this embodiment described above, the same advantages as in the first embodiment are obtained.

While embodiments of the present disclosure have been described above in detail with reference to the accompanying drawings, the present disclosure can be applied to other aspects.

For example, in the first embodiment, the maximum rotation speed Nemax is set using the map based on the vehicle condition as illustrated in FIG. 8, but an applicable embodiment of the present disclosure is not limited to this aspect. For example, the maximum rotation speed Nemax which varies based on the supercharging pressure Pchg or the like may be set only when the vehicle condition is the predetermined vehicle condition, and the maximum rotation speed Nemax which is determined to be constant regardless of the supercharging pressure Pchg or the like may be set when the vehicle condition is the normal vehicle condition. In this case, in S30 in the flowchart illustrated in FIG. 9, for example, the maximum rotation speed Nemax which is a predetermined constant default value which is used when the vehicle condition is the normal vehicle condition is corrected to a smaller value based on the supercharging pressure Pchg or the like. In S40 and S50 in the flowchart illustrated in FIG. 9, the maximum rotation speed Nemax which is a default value is set, that is, the maximum rotation speed Nemax is not corrected. Alternatively, the maximum rotation speed Nemax may be set based on the supercharging pressure Pchg or the like without using different maps according to the vehicle condition. In this case, S10 in the flowchart illustrated in FIG. 9 is unnecessary, and the maximum rotation speed Nemax is set using a predetermined constant map regardless of the vehicle condition in S20 to S50.

In S70 in the flowchart of FIG. 9 according to the first embodiment, for example, MG2 torque-cut control for stopping the output of the MG2 torque Tm or torque decrease control for decreasing the MG2 torque Tm may be performed in addition to decreasing the engine torque Te at the time of idling of the driving wheels 16. As a result, it is possible to further prevent the output rotation speed No from increasing and to further prevent the engine rotation speed Ne from falling into a high-rotation state.

In the first embodiment, the vehicle 10 may be a vehicle which does not include the gear shifting unit 58 and in which the engine 12 is connected to the differential unit 60 like the vehicle 200. The differential unit 60 may be a mechanism in which a differential operation can be limited by control of a clutch or brake connected to the rotary elements of the second planetary gear mechanism 82. The second planetary gear mechanism 82 may be a double pinion type planetary gear unit. The second planetary gear mechanism 82 may be a differential mechanism including four or more rotary elements by connection between a plurality of planetary gear units. The second planetary gear mechanism 82 may be a differential gear mechanism in which the first rotary machine MG1 and the drive gear 74 are connected to the pinion which is rotationally driven by the engine 12 and a pair of bevel gears engaging with the pinion, respectively. The second planetary gear mechanism 82 may be a mechanism with a configuration in which some rotary elements of two or more planetary gear units are connected to each other and the engine, the rotary machine, and the driving wheels are connected to the rotary elements of such planetary gear units in a power-transmittable manner.

In the second embodiment, the one-way clutch F0 is exemplified as a lock mechanism that can fix the carrier CA0 in a non-rotatable manner, but an applicable embodiment of the present disclosure is not limited to the aspect. This lock mechanism may be an engagement device such as an engaging clutch, a hydraulic frictional engagement device such as a clutch or a brake, a dry engagement device, an electromagnetic frictional engagement device, or a magnetic powder type clutch which selectively connects the connection shaft 226 and the case 214. Alternatively, the vehicle 200 does not have to include the one-way clutch F0.

In the second embodiment, the stepped gear shifting unit 218 is exemplified above as the automatic transmission constituting a part of the power transmission path between the differential mechanism 230 and the driving wheels 206, but an applicable embodiment of the present disclosure is not limited to the aspect. The automatic transmission may be an automatic transmission such as a synchromesh parallel biaxial automatic transmission, a known dual clutch transmission (DCT) with two input shafts as the synchromesh parallel biaxial automatic transmission, or a known belt type stepless transmission.

In the third embodiment, the engine 302 of the vehicle 300 is not mechanically connected to the driving wheels 310, but an applicable embodiment of the present disclosure is not limited to this aspect. For example, the vehicle 300 may employ a configuration in which the engine 302 and the driving wheels 310 are connected to each other via a clutch and power of the engine 302 may be mechanically transmitted to the driving wheels 310, for example, by engaging the clutch at the time of travel at a high speed. The power transmission device 308 may include an automatic transmission.

In the embodiments described above, a mechanical pump type supercharger that is rotationally driven by an engine or an electric motor may be provided in addition to or instead of the exhaust turbine type supercharger 18. Alternatively, the supercharger 18 may include an actuator that can control the rotation speed of the compressor 18c, for example, an electric motor.

The above-mentioned embodiments are merely exemplary and the present disclosure can be embodied in various aspects which have been subjected to various modifications and improvements based on knowledge of those skilled in the art.

What is claimed is:

1. A control device for a hybrid vehicle including an engine with a supercharger and a rotary machine that is able to adjust a rotation speed of the engine, the control device comprising:
   a high rotation curbing unit configured to control the engine and the rotary machine such that an operating point of the engine reaches a target operating point which is set such that the rotation speed of the engine is within a range which does not exceed a maximum rotation speed with a margin of the rotation speed of the engine from a predetermined upper-limit rotation speed of each of the engine and the rotary machine and an output required for the engine is output from the engine and to control the engine such that an output torque of the engine decreases when the rotation speed of the engine exceeds the maximum rotation speed; and
   a rotation speed setting unit configured to set the maximum rotation speed to a lower value when a supercharging pressure from the supercharger is high than when the supercharging pressure is low.

2. The control device for a hybrid vehicle according to claim 1, wherein the rotation speed setting unit is configured to set the maximum rotation speed to a lower value as the supercharging pressure becomes higher.

3. The control device for a hybrid vehicle according to claim 1, wherein the rotation speed setting unit is configured to set the maximum rotation speed to a lower value when a temperature of intake air of the engine is low than when the temperature of intake air is high.

4. The control device for a hybrid vehicle according to claim 3, wherein the rotation speed setting unit is configured to set the maximum rotation speed to a lower value as the temperature of intake air of the engine becomes lower.

5. The control device for a hybrid vehicle according to claim 1, further comprising a condition determining unit configured to determine whether a vehicle condition is a predetermined vehicle condition in which the rotation speed of the engine or the rotation speed of the rotary machine is likely to reach a predetermined upper-limit rotation speed,
   wherein the rotation speed setting unit is configured to set the maximum rotation speed to a lower value when it is determined that the vehicle condition is the predetermined vehicle condition than when it is determined that the vehicle condition is not the predetermined vehicle condition.

6. The control device for a hybrid vehicle according to claim 5, wherein the condition determining unit is configured to determine whether the vehicle condition is the predetermined vehicle condition based on whether the hybrid vehicle is traveling on a road on which driving wheels to which power of the engine is transmitted are likely to slip.

7. The control device for a hybrid vehicle according to claim 5, wherein the condition determining unit is configured to determine whether the vehicle condition is the predetermined vehicle condition based on whether the rotary machine is subjected to a predetermined output limitation.

8. The control device for a hybrid vehicle according to claim 7, wherein the condition determining unit is configured to determine that the rotary machine is subjected to the predetermined output limitation when a temperature of the rotary machine or a temperature of a power storage device that transmits and receives electric power to and from the rotary machine is outside of a predetermined normal temperature area thereof.

9. The control device for a hybrid vehicle according to claim 5, wherein the condition determining unit is configured to determine whether the vehicle condition is the predetermined vehicle condition based on whether a braking operation of a brake device that applies a wheel brake torque to driving wheels to which a power of the engine is transmitted is limited.

* * * * *